United States Patent
Lo et al.

(10) Patent No.: US 11,483,832 B1
(45) Date of Patent: Oct. 25, 2022

(54) METHODS AND APPARATUS FOR FLEXIBLE USE OF FREQUENCY BANDS

(71) Applicant: NEO WIRELESS LLC, Wayne, PA (US)

(72) Inventors: Titus Lo, Bellevue, WA (US); Xiaodong Li, Bellevue, WA (US)

(73) Assignee: Neo Wireless LLC, Wayne, PA (US)

( * ) Notice: Subject to any disclaimer, the term of this patent is extended or adjusted under 35 U.S.C. 154(b) by 0 days.

(21) Appl. No.: 17/726,846

(22) Filed: Apr. 22, 2022

Related U.S. Application Data

(63) Continuation of application No. 17/723,752, filed on Apr. 19, 2022, which is a continuation of application (Continued)

(51) Int. Cl.
*H04W 72/04* (2009.01)
*H04L 41/04* (2022.01)
(Continued)

(52) U.S. Cl.
CPC ....... *H04W 72/0453* (2013.01); *H04L 5/0007* (2013.01); *H04L 5/14* (2013.01);
(Continued)

(58) Field of Classification Search
CPC . H04W 72/0453; H04W 16/14; H04W 24/02; H04W 48/16; H04W 84/18;
(Continued)

(56) References Cited

U.S. PATENT DOCUMENTS

| 5,170,413 A | 12/1992 | Hess et al. |
|---|---|---|
| 5,506,615 A | 4/1996 | Awaji |

(Continued)

FOREIGN PATENT DOCUMENTS

| CN | 1571512 A | 1/2005 |
|---|---|---|
| CN | 1571531 A | 1/2005 |

(Continued)

OTHER PUBLICATIONS

3rd Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.1.0, Sep. 2010, 192 pages.

(Continued)

*Primary Examiner* — Maharishi V Khirodhar
*Assistant Examiner* — Kenneth P Hunt
(74) *Attorney, Agent, or Firm* — Volpe Koenig

(57) ABSTRACT

Methods and systems are disclosed for communicating in a wireless communications system utilizing a plurality of frequency bands for downlink (DL) transmission and a plurality of frequency bands for uplink (UL) transmission. In an embodiment, a mobile device receives a DL signal via a DL frequency band. The DL signal contains DL-UL frequency band association information which is used to determine a UL frequency band for UL transmission. The mobile device configures its radio-frequency (RF) circuitry to operate in the UL frequency band for UL transmission.

30 Claims, 23 Drawing Sheets

Related U.S. Application Data

No. 15/831,310, filed on Dec. 4, 2017, now Pat. No. 11,310,795, which is a continuation of application No. 15/174,650, filed on Jun. 6, 2016, now Pat. No. 9,839,037, which is a continuation of application No. 14/041,495, filed on Sep. 30, 2013, now Pat. No. 9,363,066, which is a continuation of application No. 13/391,044, filed as application No. PCT/US2011/053494 on Sep. 27, 2011, now Pat. No. 8,547,884.

(60) Provisional application No. 61/404,153, filed on Sep. 28, 2010.

(51) Int. Cl.
| | |
|---|---|
| *H04L 41/12* | (2022.01) |
| *H04L 45/02* | (2022.01) |
| *H04L 5/00* | (2006.01) |
| *H04L 5/14* | (2006.01) |
| *H04W 16/14* | (2009.01) |
| *H04W 24/02* | (2009.01) |
| *H04W 48/16* | (2009.01) |
| *H04W 8/00* | (2009.01) |
| *H04L 9/40* | (2022.01) |
| *H04W 84/18* | (2009.01) |
| *H04L 41/044* | (2022.01) |
| *H04L 43/10* | (2022.01) |
| *H04L 43/0817* | (2022.01) |
| *H04L 41/082* | (2022.01) |

(52) U.S. Cl.
CPC .............. *H04L 41/04* (2013.01); *H04L 41/12* (2013.01); *H04L 45/02* (2013.01); *H04W 8/005* (2013.01); *H04W 16/14* (2013.01); *H04W 24/02* (2013.01); *H04W 48/16* (2013.01); *H04W 72/042* (2013.01); *H04W 72/0406* (2013.01); *H04W 72/0413* (2013.01); *H04L 41/044* (2013.01); *H04L 41/082* (2013.01); *H04L 43/0817* (2013.01); *H04L 43/10* (2013.01); *H04L 63/20* (2013.01); *H04W 84/18* (2013.01)

(58) Field of Classification Search
CPC ......... H04L 5/0007; H04L 5/14; H04L 41/04; H04L 41/12; H04L 45/02; H04L 41/044; H04L 41/082; H04L 43/10; H04L 63/20
See application file for complete search history.

(56) References Cited

U.S. PATENT DOCUMENTS

| | | | |
|---|---|---|---|
| 5,659,545 | A | 8/1997 | Sowles et al. |
| 5,726,978 | A | 3/1998 | Frodigh et al. |
| 5,734,444 | A | 3/1998 | Yoshinobu |
| 5,794,116 | A | 8/1998 | Matsuda et al. |
| 5,878,324 | A | 3/1999 | Borth et al. |
| 5,898,338 | A | 4/1999 | Proctor et al. |
| 5,929,704 | A | 7/1999 | Proctor, Jr. et al. |
| 6,023,725 | A | 2/2000 | Ozawa et al. |
| 6,052,145 | A | 4/2000 | Macrae et al. |
| 6,078,216 | A | 6/2000 | Proctor, Jr. |
| 6,081,697 | A | 6/2000 | Haartsen |
| 6,201,970 | B1 | 3/2001 | Suzuki et al. |
| 6,256,509 | B1 | 7/2001 | Tanaka et al. |
| 6,292,474 | B1 | 9/2001 | Ali et al. |
| 6,370,153 | B1 | 4/2002 | Eng |
| 6,381,250 | B1 | 4/2002 | Jacobson et al. |
| 6,493,331 | B1 | 12/2002 | Walton et al. |
| 6,529,146 | B1 | 3/2003 | Kowalski et al. |
| 6,603,979 | B1 | 8/2003 | Hirsch |
| 6,701,528 | B1 | 3/2004 | Arsenault et al. |
| 6,788,959 | B2 | 9/2004 | Jokinen et al. |
| 6,836,664 | B2 | 12/2004 | McGovern et al. |
| 6,886,042 | B1 | 4/2005 | Watahiki et al. |
| 6,904,550 | B2 | 6/2005 | Sibecas et al. |
| 6,950,624 | B2 | 9/2005 | Kim et al. |
| 6,965,580 | B1 | 11/2005 | Takagi et al. |
| 7,031,348 | B1 | 4/2006 | Gazit |
| 7,050,511 | B2 | 5/2006 | Jeong et al. |
| 7,085,576 | B2 | 8/2006 | Ranganathan |
| 7,142,864 | B2 | 11/2006 | Laroia et al. |
| 7,184,726 | B2 | 2/2007 | Shibata |
| 7,197,025 | B2 | 3/2007 | Chuah |
| 7,200,124 | B2 | 4/2007 | Kim et al. |
| 7,203,158 | B2 | 4/2007 | Oshima et al. |
| 7,260,079 | B1 | 8/2007 | Chapman et al. |
| 7,324,832 | B2 | 1/2008 | van Rooyen |
| 7,336,646 | B2 | 2/2008 | Müller |
| 7,339,882 | B2 | 3/2008 | Schaefer et al. |
| 7,352,722 | B2 | 4/2008 | Malladi et al. |
| 7,391,751 | B2 | 6/2008 | Lee et al. |
| 7,406,104 | B2 | 7/2008 | Yang et al. |
| 7,418,193 | B2 | 8/2008 | Miyagawa et al. |
| 7,428,385 | B2 | 9/2008 | Lee et al. |
| 7,500,261 | B1 | 3/2009 | Myers |
| 7,548,506 | B2 | 6/2009 | Ma et al. |
| 7,630,356 | B2 | 12/2009 | Zhang et al. |
| 7,633,971 | B1 | 12/2009 | Butler et al. |
| 7,660,229 | B2 | 2/2010 | Papasakellariou et al. |
| 7,680,094 | B2 | 3/2010 | Liu |
| 7,683,664 | B1 | 3/2010 | Gaide |
| 7,684,807 | B2 | 3/2010 | Schmidt |
| 7,734,762 | B2 | 6/2010 | Hundscheidt et al. |
| 7,801,490 | B1 | 9/2010 | Scherzer |
| 7,961,609 | B2 | 6/2011 | Teague et al. |
| 7,969,858 | B2 * | 6/2011 | Laroia ................. H04L 27/2601 |
| | | | 370/208 |
| 8,014,264 | B2 | 9/2011 | Li et al. |
| 8,046,801 | B2 | 10/2011 | Ellis et al. |
| 8,089,911 | B2 | 1/2012 | Huang et al. |
| 8,130,699 | B2 | 3/2012 | Stanwood et al. |
| 8,194,574 | B2 | 6/2012 | Shinozaki |
| 8,374,115 | B2 | 2/2013 | Huang et al. |
| 8,400,951 | B2 | 3/2013 | Nangia et al. |
| 8,514,793 | B2 | 8/2013 | Gauvreau et al. |
| 8,547,883 | B2 | 10/2013 | Jung et al. |
| 8,547,884 | B2 * | 10/2013 | Lo .......... H04W 48/16 |
| | | | 370/295 |
| 8,553,589 | B2 | 10/2013 | Hui et al. |
| 8,582,592 | B2 | 11/2013 | Gorokhov et al. |
| 8,634,375 | B2 | 1/2014 | Huang et al. |
| 8,687,608 | B2 | 4/2014 | Soliman |
| 9,363,066 | B2 * | 6/2016 | Lo .......... H04W 8/005 |
| 9,839,037 | B2 * | 12/2017 | Lo .......... H04W 72/0413 |
| 9,854,577 | B2 | 12/2017 | Stanwood et al. |
| 10,638,468 | B2 | 4/2020 | Nelson et al. |
| 11,310,795 | B2 * | 4/2022 | Lo .......... H04L 41/04 |
| 2001/0017853 | A1 | 8/2001 | Kikuchi et al. |
| 2001/0039663 | A1 | 11/2001 | Sibley |
| 2001/0055322 | A1 | 12/2001 | Domon |
| 2002/0031097 | A1 | 3/2002 | Jung |
| 2002/0080887 | A1 | 6/2002 | Jeong et al. |
| 2002/0102983 | A1 | 8/2002 | Furuskar et al. |
| 2002/0118666 | A1 | 8/2002 | Stanwood et al. |
| 2002/0122406 | A1 | 9/2002 | Chillariga et al. |
| 2002/0126780 | A1 | 9/2002 | Oshima et al. |
| 2002/0150387 | A1 | 10/2002 | Kunii et al. |
| 2002/0162114 | A1 | 10/2002 | Bisher, Jr. et al. |
| 2002/0163695 | A1 | 11/2002 | Unitt et al. |
| 2002/0166128 | A1 | 11/2002 | Ikeda et al. |
| 2003/0032389 | A1 | 2/2003 | Kim et al. |
| 2003/0037331 | A1 | 2/2003 | Lee |
| 2003/0045254 | A1 | 3/2003 | Shibata |
| 2003/0072255 | A1 | 4/2003 | Ma et al. |
| 2003/0076812 | A1 | 4/2003 | De Benedittis |
| 2003/0117980 | A1 | 6/2003 | Kim et al. |
| 2003/0119452 | A1 | 6/2003 | Kim et al. |
| 2003/0125025 | A1 | 7/2003 | Lim |
| 2003/0152094 | A1 | 8/2003 | Colavito et al. |
| 2003/0207696 | A1 | 11/2003 | Willenegger et al. |

(56) References Cited

U.S. PATENT DOCUMENTS

| | | |
|---|---|---|
| 2003/0214928 A1 | 11/2003 | Chuah |
| 2003/0224731 A1 | 12/2003 | Yamaura et al. |
| 2004/0001429 A1 | 1/2004 | Ma et al. |
| 2004/0062222 A1 | 4/2004 | Seidel et al. |
| 2004/0082356 A1 | 4/2004 | Walton et al. |
| 2004/0120285 A1 | 6/2004 | Paila et al. |
| 2004/0131084 A1 | 7/2004 | Bing et al. |
| 2004/0141502 A1 | 7/2004 | Corson et al. |
| 2004/0184471 A1 | 9/2004 | Chuah et al. |
| 2004/0192342 A1 | 9/2004 | Ranganathan |
| 2004/0224691 A1 | 11/2004 | Hadad |
| 2004/0259503 A1 | 12/2004 | Ogura |
| 2005/0025039 A1 | 2/2005 | Hwang et al. |
| 2005/0028208 A1 | 2/2005 | Ellis et al. |
| 2005/0037795 A1 | 2/2005 | Aaltonen et al. |
| 2005/0055723 A1 | 3/2005 | Atad et al. |
| 2005/0063345 A1 | 3/2005 | Wu et al. |
| 2005/0068990 A1 | 3/2005 | Liu |
| 2005/0085214 A1 | 4/2005 | Laroia et al. |
| 2005/0108763 A1 | 5/2005 | Baran et al. |
| 2005/0111397 A1 | 5/2005 | Attar et al. |
| 2005/0113099 A1 | 5/2005 | Eriksson et al. |
| 2005/0128993 A1 | 6/2005 | Yu et al. |
| 2005/0135295 A1 | 6/2005 | Walton et al. |
| 2005/0135416 A1 | 6/2005 | Ketchum et al. |
| 2005/0141475 A1 | 6/2005 | Vijayan et al. |
| 2005/0152409 A1 | 7/2005 | Zhao et al. |
| 2005/0152697 A1 | 7/2005 | Lee et al. |
| 2005/0174954 A1 | 8/2005 | Yun et al. |
| 2005/0174964 A1 | 8/2005 | Orlik et al. |
| 2005/0175070 A1 | 8/2005 | Grob et al. |
| 2005/0193309 A1 | 9/2005 | Grilli et al. |
| 2005/0195823 A1 | 9/2005 | Chen et al. |
| 2005/0204388 A1 | 9/2005 | Knudson et al. |
| 2005/0254427 A1 | 11/2005 | Leon et al. |
| 2005/0265280 A1 | 12/2005 | Roh et al. |
| 2006/0007930 A1 | 1/2006 | Dorenbosch |
| 2006/0013168 A1 | 1/2006 | Agrawal et al. |
| 2006/0013325 A1 | 1/2006 | Agrawal et al. |
| 2006/0018347 A1 | 1/2006 | Agrawal |
| 2006/0019677 A1 | 1/2006 | Teague et al. |
| 2006/0069799 A1 | 3/2006 | Hundscheidt et al. |
| 2006/0088023 A1 | 4/2006 | Muller |
| 2006/0098567 A1 | 5/2006 | Willenegger et al. |
| 2006/0126546 A1 | 6/2006 | Lee et al. |
| 2006/0128428 A1 | 6/2006 | van Rooyen |
| 2006/0146745 A1 | 7/2006 | Cai et al. |
| 2006/0146822 A1 | 7/2006 | Kolakowski et al. |
| 2006/0146853 A1 | 7/2006 | Paila |
| 2006/0159003 A1 | 7/2006 | Nanda et al. |
| 2006/0176966 A1 | 8/2006 | Stewart et al. |
| 2006/0182022 A1 | 8/2006 | Abedi |
| 2006/0193338 A1 | 8/2006 | Zheng et al. |
| 2006/0198325 A1 | 9/2006 | Gao et al. |
| 2006/0211436 A1 | 9/2006 | Paila et al. |
| 2006/0251045 A1 | 11/2006 | Okubo |
| 2006/0256884 A1 | 11/2006 | Tomioka et al. |
| 2007/0002858 A1 | 1/2007 | Bichot et al. |
| 2007/0025290 A1 | 2/2007 | Afrashteh et al. |
| 2007/0058595 A1 | 3/2007 | Glasson et al. |
| 2007/0064588 A1 | 3/2007 | Kisoda et al. |
| 2007/0081538 A1 | 4/2007 | Ganji |
| 2007/0218889 A1 | 9/2007 | Zhang et al. |
| 2007/0253466 A1 | 11/2007 | Jones et al. |
| 2008/0056117 A1* | 3/2008 | Muharemovic ....... H04L 5/0033 370/203 |
| 2008/0130483 A1 | 6/2008 | Khandekar et al. |
| 2008/0137562 A1 | 6/2008 | Li et al. |
| 2008/0170530 A1 | 7/2008 | Connors et al. |
| 2008/0198785 A1 | 8/2008 | Huang et al. |
| 2009/0023469 A1 | 1/2009 | Tomioka et al. |
| 2009/0028109 A1 | 1/2009 | Huang et al. |
| 2009/0052355 A1 | 2/2009 | Jung et al. |
| 2009/0067403 A1 | 3/2009 | Chan et al. |
| 2009/0185632 A1 | 7/2009 | Cai et al. |
| 2009/0215499 A1 | 8/2009 | Moon et al. |
| 2009/0258628 A1 | 10/2009 | Lindoff et al. |
| 2009/0310692 A1 | 12/2009 | Kafle et al. |
| 2010/0020731 A1 | 1/2010 | Bourdeaut et al. |
| 2010/0067465 A1 | 3/2010 | Miki et al. |
| 2010/0130137 A1 | 5/2010 | Pelletier et al. |
| 2010/0165893 A1 | 7/2010 | Edwards |
| 2010/0173586 A1 | 7/2010 | McHenry et al. |
| 2010/0227622 A1 | 9/2010 | Mody et al. |
| 2010/0255854 A1 | 10/2010 | Lee et al. |
| 2010/0265905 A1 | 10/2010 | Lee et al. |
| 2010/0272051 A1 | 10/2010 | Fu et al. |
| 2011/0002311 A1 | 1/2011 | Wang et al. |
| 2011/0103243 A1 | 5/2011 | Larsson et al. |
| 2011/0194515 A1 | 8/2011 | Nakao et al. |
| 2011/0267978 A1 | 11/2011 | Etemad |
| 2012/0039275 A1 | 2/2012 | Chen et al. |
| 2012/0063381 A1 | 3/2012 | Huang et al. |
| 2012/0093079 A1 | 4/2012 | Yuk et al. |
| 2012/0176952 A1 | 7/2012 | Huang et al. |
| 2012/0230265 A1 | 9/2012 | Lee et al. |
| 2012/0257551 A1 | 10/2012 | Diao et al. |
| 2012/0269148 A1 | 10/2012 | Hultell et al. |
| 2012/0320860 A1 | 12/2012 | Chun et al. |
| 2012/0327897 A1 | 12/2012 | Huang et al. |
| 2013/0012191 A1 | 1/2013 | Charbit et al. |
| 2013/0028128 A1 | 1/2013 | Novak et al. |
| 2013/0121232 A1 | 5/2013 | Huang et al. |
| 2013/0343239 A1 | 12/2013 | Damnjanovic et al. |
| 2014/0254609 A1 | 9/2014 | Petry et al. |
| 2016/0286556 A1 | 9/2016 | Lo et al. |
| 2017/0295409 A1 | 10/2017 | Simon et al. |
| 2018/0041936 A1 | 2/2018 | Kim et al. |
| 2020/0296576 A1 | 9/2020 | Ouchi et al. |
| 2022/0248404 A1* | 8/2022 | Lo ........................... H04L 41/12 |

FOREIGN PATENT DOCUMENTS

| | | |
|---|---|---|
| CN | 1678068 A | 10/2005 |
| CN | 1332556 C | 8/2007 |
| CN | 101197655 | 6/2008 |
| KR | 2005-0053377 | 6/2005 |
| KR | 20050053377 A | 6/2005 |
| WO | 2002/05506 | 1/2002 |
| WO | 2002005506 A2 | 1/2002 |
| WO | 2006/001671 | 1/2006 |
| WO | 2006001671 A1 | 1/2006 |
| WO | 2006/086878 | 8/2006 |
| WO | 2006086878 A1 | 8/2006 |
| WO | 2007/052995 | 5/2007 |
| WO | 2007052995 A1 | 5/2007 |

OTHER PUBLICATIONS

Agilent "Concepts of Orthogonal Frequency Division Multiplexing (OFDM) and 802.11 WLAN" http://wireless.agilent.com/wireless/helpfiles/89600B/WebHelp/Subsystems/wlanofdm/ContenUofdm.sub.-basicprinciplesoverview.htm.

Agilent, "LTE Physical Layer Overview" http://wireless.agilent.com/wireless/helpfiles/89600B/WebHelp/subsystems/-lte/contenUite.sub.-overview.htm.

Comlab "Usage of OFDM in a wideband fading channel" http://www.comlab.hut.fi/studies/3320/3320%20ofdm.pdf.

Dahlman et al., *4G LTE/LTE-Advanced for Mobile Broadband*, Academic Press (May 10, 2011).

International Patent Application No. PCT/US2011/053494: International Search Report dated Jan. 18, 2012, 10 pages.

International Patent Application No. PCT/US2011/053494: International Search Report dated Jan. 18, 2012, 5 pages (Box No. V Reasoned statement under Rule 43bis.1 (a)(i) attached).

Johnson and Sethares, Telecommunication Breakdown Concepts of Communication Transmitted via Software Defined Radio, 2004, Pearson Prentice Hall, pp. 43-48 and 81-82.

Sesia et al., *LTE The UMTS Long Term Evolution From Theory to Practice*, John Wiley & Sons, Ltd. (2009).

(56) References Cited

OTHER PUBLICATIONS

Supplement to IEEE Standard for Information technology—Telecommunications and information exchange between systems—Local and metropolitan area networks—Specific requirements; Part 11: Wireless LAN Medium. Access Control (MAC) and. Physical Layer (PHY) specifications: High-speed Physical Layer in the 2.4 GHz Band, IEEE Std 802.11b-1999 (R2003) (Jun. 12, 2003).
Telesystem Innovations, "LTE in a Nutshell: The Physical Layer," 2010, http://www.tsiwireless.com/docs/whitepapers/LTE%20in%20a%20Nutshell%20-%2-0Physicai%20Layer.pdf.
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.4.0 (Jun. 2010).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.7.0 (Mar. 2011).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.0.0 (Jun. 2010).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.3.0 (Jun. 2010).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.7.0 (Jun. 2011).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.2.0 (Jun. 2011).
Third Generation Partnership Project, "Technical Specification Group Radio Access Network; Evolved Universal Terrestrial Radio Access (E-UTRA); Physical layer procedures (Release 9)," 3GPP TS 36.213 V9.3.0 (Sep. 2010).
Third Generation Partnership Project, "Technical Specification Group Radio Access Network; Evolved Universal Terrestrial Radio Access (E-UTRA); Physical layer procedures (Release 10)," 3GPP TS 36.213 V10.3.0 (Sep. 2011).
Third Generation Partnership Project, "Technical Specification Group Radio Access Network; Evolved Universal Terrestrial Radio Access (E-UTRA); Base Station (BS) radio transmission and reception (Release 9)," 3GPP TS 36.104 V9.4.0 (Jun. 2010).
Third Generation Partnership Project, "Technical Specification Group Radio Access Network; Evolved Universal Terrestrial Radio Access (E-UTRA); Base Station (BS) radio transmission and reception (Release 9)," 3GPP Ts 36.104 V9.8.0 (Jun. 2011).
Third Generation Partnership Project, "Technical Specification Group Radio Access Network; Evolved Universal Terrestrial Radio Access (E-UTRA); Base Station (BS) radio transmission and reception (Release 10)," 3GPP TS 36.104 V10.3.0 (Jun. 2011).
Third Generation Partnership Project, "Technical Specification Group Radio Access Network; Evolved Universal Terrestrial Radio Access (E-UTRA); Physical Channels and Modulation (Release 9)," 3GPP TS 36.211 V9.1.0 (Mar. 2010).
Third Generation Partnership Project, "Technical Specification Group Radio Access Network; Evolved Universal Terrestrial Radio Access (E-UTRA); Physical Channelsand Modulation (Release 10)," 3GPP TS 36.211 V10.3.0 (Sep. 2011).
Third Generation Partnership Project, "Technical Specification Group Radio Access Network; Evolved Universal Terrestrial Radio Access (E-Utra); LTE physical layer; General description (Release 9)," 3GPP TS 36.201 V9.1.0 (Mar. 2010).
Third Generation Partnership Project, "Technical Specification Group Radio Access Network; Evolved Universal Terrestrial Radio Access (E-UTRA); LTE physical layer; General description (Release 10)," 3GPP TS 36.201 V10.0.0 (Dec. 2010).
Third Generation Partnership Project, "Technical Specification Group Radio Access Network; Evolved Universal Terrestrial Radio Access (E-UTRA); User Equipment (UE) radio transmission and reception (Release 9)," 3GPP TS 36.101 V9.4.0 (Jun. 2010).
Third Generation Partnership Project, "Technical Specification Group Radio Access Network; Evolved Universal Terrestrial Radio Access (E-UTRA); User Equipment (UE) radio transmission and reception (Release 9)," 3GPP TS 36.101 V9.8.0 (Jun. 2011).
Third Generation Partnership Project, "Technical Specification Group Radio Access Network; Evolved Universal Terrestrial Radio Access (E-UTRA); User Equipment (UE) radio transmission and reception (Release 10)," 3GPP TS 36.101 V10.3.0 (Jun. 2011).
Third Generation Partnership Project, "Technical Specification Group Radio Access Network; Evolved Universal Terrestrial Radio Access (E-UTRA); Base Station (BS) conformance testing (Release 10)," 3GPP TS 36.141 V10.3.0 (Jun. 2011).
Third Generation Partnership Project, "Technical Specification Group Radio Access Network; Evolved Universal Terrestrial Radio Access (E-UTRA); Base Station (BS) conformance testing (Release 9)," 3GPP TS 36.141 V9.8.0 (Jun. 2011).
Third Generation Partnership Project, "Technical Specification Group Radio Access Network; Evolved Universal Terrestrial Radio Access (E-UTRA); Base Station (BS) conformance testing (Release 9)," 3GPP TS 36.141 V9.4.0 (Jun. 2010).
Third Generation Partnership Project, "Technical Specification Group Radio Access Network; Evolved Universal Terrestrial Radio Access (E-UTRA); Multiplexing and channel coding (Release 9)," 3GPP TS 36.212 V9.2.0 (Jun. 2010).
Third Generation Partnership Project, "Technical Specification Group Radio Access Network; Evolved Universal Terrestrial Radio Access (E-UTRA); Multiplexing and channel coding (Release 9)," 3GPP TS 36.212 V9.4.0 (Sep. 2011).
Third Generation Partnership Project, "Technical Specification Group Radio Access Network; Evolved Universal Terrestrial Radio Access (E-UTRA); Multiplexing and channel coding (Release 10)," 3GPP TS 36.212 V10.3.0 (Sep. 2011).
Third Generation Partnership Project, "Technical Specification Group Radio Access Network; Evolved Universal Terrestrial Radio Access (E-UTRA); User Equipment (UE) radio access capabilities (Release 9)," 3GPP TS 36.306 V9.4.0 (Jun. 2011).
Third Generation Partnership Project, "Technical Specification Group Radio Access Network; Evolved Universal Terrestrial Radio Access (E-UTRA); User Equipment (UE) radio access capabilities (Release 9)," 3GPP TS 36.306 V9.2.0 (Jun. 2010).
Third Generation Partnership Project, "Technical Specification Group Radio Access Network; Evolved Universal Terrestrial Radio Access (E-UTRA); User Equipment (UE) radio access capabilities (Release 10)," 3GPP TS 36.306 V10.2.0 (Jun. 2011).
Third Generation Partnership Project, "Technical Specification Group Radio Access Network; Evolved Universal Terrestrial Radio Access (E-UTRA); Services provided by the physical layer (Release 9)," 3GPP TS 36.302 V9.2.0 (Jun. 2010).
Third Generation Partnership Project, "Technical Specification Group Radio Access Network; Evolved Universal Terrestrial Radio Access (E-UTRA); Services provided by the physical layer (Release 9)," 3GPP TS 36.302 V9.3.0 (Mar. 2011).
Third Generation Partnership Project, "Technical Specification Group Radio Access Network; Evolved Universal Terrestrial Radio Access (E-UTRA); Services provided by the physical layer (Release 10)," 3GPP TS 36.302 V10.2.0 (Jun. 2011).
Third Generation Partnership Project, "Technical Specification Group Radio Access Network; Evolved Universal Terrestrial Radio Access (E-UTRA); Medium Access Control (MAC) protocol specification (Release 9)," 3GPP TS 36.321 V9.3.0 (Jun. 2010).
Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.2.0 (Jun. 2011).

(56) References Cited

OTHER PUBLICATIONS

Wikipedia, "List of WLAN Channels," available at https://web.archive.org/web/20100221071342/en.wikipedia.org/wiki/list_of_wlan_channels (Feb. 21, 2010).
Baxley et al., "Power Savings Analysis of Peak-to-Average Power Ratio Reduction in OFDM," IEEE Transactions an Consumer Electronics, vol. 50, No. 3 (Aug. 2004).
Definition of "frequency-division multiplexing," McGraw-Hill, Dictionary of Scientific and Technical Terms, 6th Edition (2003).
Guo et al., "Reducing Peak-to-Average Power Ratio in OFDM Systems by Adaptive Dynamic Range Companding," 2002 World Wireless Congress, San Francisco, CA (2002).
*Huizhou TCL Mobile Communication Co. Ltd. et al.*, v. *Wi-Lan Inc.*, Declaration of Dr. Titus Lo, PTAB Case No. IPR2020-00304 (Dec. 22, 2019).
IEEE Standard for Information technology—Telecommunications and information exchange between systems—Local and metropolitan area networks—Specific requirements; Part 11: Wireless LAN Medium Access Control (MAC) and Physical Layer (PHY) specifications Amendment 4: Further Higher Data Rate Extension in the 2.4 GHz Band, IEEE Std 802.11g-2003 (Jun. 27, 2003).
IEEE Standard for Information Technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2007 (Jun. 12, 2007).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Local and metropolitan area networks; Part 16: Air Interface for Fixed Broadband Wireless Access Systems—Amendment 2: Physical and Medium Access Control Layers for Combined Fixed and Mobile Operation in Licensed Bands and Corrigendum 1, IEEE Std. 802.16e-2005 (Feb. 28, 2006).
Johnson et al., Telecommunication Breakdown Concepts of Communication Transmitted via Software Defined Radio, 2004, Pearson Prentice Hall, pp. 43-48 and 81-82.
Koffman et al., "Broadband Wireless Access Solutions Based on OFDM Access in IEEE 802.16," IEEE Communications Magazine, pp. 96-103 (Apr. 2002).

Lathi, Modern Digital and Analog Communication Systems 3rd Edition, 1998, Oxford University Press, pp. 189-191.
Litva et al., Digital Beamforming in Wireless Communications, Artech House Inc., ISBN 0-89006-712-0, pp. 1-308 (1996).
Panta et al., "Use of Peak-to-Average Power Reduction Technique in HIPERLAN2 and its Performance in a Fading Channel." Proc. 6th International Symposium on DSP for Communication Systems, pp. 113-117, (2002).
Prasad, "Chapter 6—The Peak Power Problem," in OFDM for Wireless Communications Systems, Artech House (2004).
Supplement to IEEE Standard for Information technology—Telecommunications and information exchange between systems—Local and metropolitan area networks—Specific requirements; Part 11: Wireless LAN Medium. Access Control (MAC) and. Physical Layer (PHY) specifications High-speed Physical Layer in the 5 GHz Band, IEEE Std 802.11a-1999(R2003) (Jun. 12, 2003).
Supplement to IEEE Standard for Information technology - Telecommunications and information exchange between systems—Local and metropolitan area networks—Specific requirements; Part 11: Wireless LAN Medium Access Control (MAC) and Physical Layer (PHY) specifications: Higher-Speed Physical Layer Extension in the 2.4 GHz Band, IEEE Std 802.11b-1999 (R2003) (Jun. 12, 2003).
Third Generation Partnership Project, "Technical Specification Group Services and System Aspects; Multimedia Broadcast/Multicast Service (MBMS); Protocols and codecs (Release 9)," 3GPP TS 26.346 V9.3.0 (Jun. 2010).
Third Generation Partnership Project, "Technical Specification Group Services and System Aspects; Multimedia Broadcast/Multicast Service (MBMS); Protocols and codecs (Release 9)," 3GPP TS 26.346 V9.4.1 (Mar. 2011).
Third Generation Partnership Project, "Technical Specification Group Services and System Aspects Multimedia Broadcast/Multicast Service (MBMS); Protocols and codecs (Release 10)," 3GPP TS 26.346 V10.0.0 (Mar. 2011).
U.S. Appl. No. 60/815,664, filed Jun. 21, 2006.
U.S. Appl. No. 60/815,733, filed Jun. 21, 2006.
U.S. Appl. No. 60/816,281, filed Jun. 23, 2006.
Van Nee et al., OFDM for Wireless Multimedia Communications, Artech House (2000).
You et al., "A Simple Construction of OFDM-CDMA Signals with Low Peak-to-Average Power Ratio," IEEE Transactions on Broadcasting, vol. 49, No. 4 (Dec. 2003).

* cited by examiner

METHODS AND APPARATUS FOR FLEXIBLE USE OF FREQUENCY BANDS

CROSS REFERENCE TO RELATED APPLICATIONS

This application is a continuation of U.S. patent application Ser. No. 17/723,752, filed Apr. 19, 2022, which is a continuation of U.S. patent application Ser. No. 15/831,310, filed Dec. 4, 2017, which issued as U.S. Pat. No. 11,310,795 on Apr. 19, 2022, which is a continuation of U.S. patent application Ser. No. 15/174,650, filed Jun. 6, 2016, which issued as U.S. Pat. No. 9,839,037 on Dec. 5, 2017, which is a continuation of U.S. patent application Ser. No. 14/041,495, filed Sep. 30, 2013, which issued as U.S. Pat. No. 9,363,066 on Jun. 7, 2016, which is a continuation of U.S. patent application Ser. No. 13/391,044, filed Feb. 17, 2012, which issued as U.S. Pat. No. 8,547,884 on Oct. 1, 2013, which is the National Stage of International Application No. PCT/US2011/053494, filed Sep. 27, 2011, which claims the priority benefit of U.S. Provisional Application No. 61/404,153, filed Sep. 28, 2010, the disclosures of which are incorporated herein by reference in their entireties.

TECHNICAL FIELD

The disclosed embodiments relate, in general, to wireless or wire-line communications and include methods and apparatus for flexible use of frequency bands or channels, although these are merely exemplary and non-limiting fields.

BACKGROUND

In a TV broadcasting system, a UHF band (a band in the 470862 MHz range), for example, is often used for high-power transmission via an antenna at a great height to cover a large area. As a result, the usual practice is that this band and even its guard bands will not be used for high-power broadcasting in the vicinities of the coverage area. These bands, however, may be re-used in the neighboring areas for relatively low-power transmission in a cellular system Since the antenna of a cellular base station is located high up above the ground clutter, the base station is vulnerable to high-level interference from the TV broadcast transmission if cellular uplink transmission is in one of these bands. Consequently, the use of a time-division duplex (TDD) system in these bands may not be viable. Using a traditional frequency-division duplex (FDD) system may also not be feasible since these bands may not have with a corresponding uplink band that is required for FDD operation.

SUMMARY

To utilize the broadcast bands for cellular communications as described above, a flexible method is needed to facilitate efficient use of radio resources. For example, one of the broadcast guard bands may be used for downlink transmission and the flexible method can enable the system to use an available band (e.g., one of the MMDS bands around 2.52.6 GHz) for UL transmission.

The flexible method can be used to effectively utilize the spectrum that may become available from the switch from analogue to digital TV broadcasting. The use of a traditional FDD system with fixed pairing of downlink and uplink bands may not be feasible since bands in this spectrum do not come as fixed pairs for FDD transmission. Although TDD systems are being considered, strictly synchronous transmission is required if adjacent bands are to be used which may prevent the use of multiple systems using different technologies or operators.

In one embodiment, a method of communicating by a mobile device in a wireless communications system is disclosed. The wireless communications system utilizes frequency bands for downlink (DL) transmission and frequency bands for uplink (UL) transmission, each frequency band having a center carrier frequency and an operation bandwidth. A DL signal is received via a first DL frequency band for DL transmission. The DL signal includes DL-UL frequency-band association information. The DL signal is decoded to obtain the DL-UL frequency-band association information. Based on the decoded DL-UL frequency-band association information, a first UL frequency band is determined for UL transmission. Radio-frequency (RF) circuitry of the mobile device is configured to operate in the first UL frequency band for UL transmission.

BRIEF DESCRIPTION OF THE DRAWINGS

The systems, methods, and computer readable media for communicating in a wireless communications system in accordance with this specification are further described with reference to the accompanying drawings in which.

DETAILED DESCRIPTION OF ILLUSTRATIVE EMBODIMENTS

Figure 1:
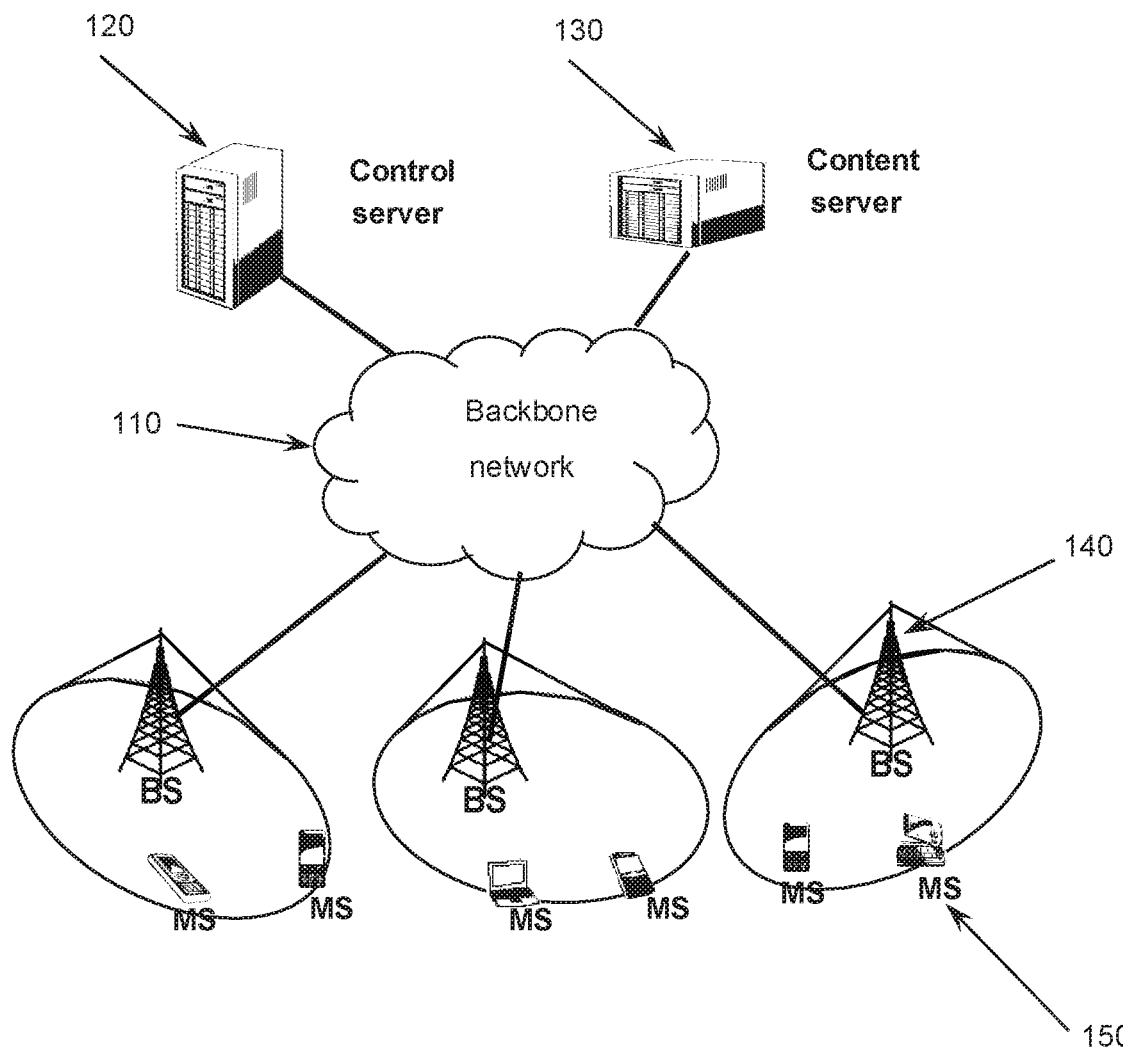
FIG. 1 depicts a representative diagram of a wireless communication system with a control server, a content server, a backbone network, base stations (BS) and mobile stations (MS).

Certain specific details are set forth in the following description and figures to provide a thorough understanding of various embodiments of the disclosure. Certain well-known details often associated with computing and software technology are not set forth in the following disclosure to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and nonvolatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Some of the embodiments described herein describe methods and systems for flexible frequency-division duplex (FFDD) transmission. The methods and systems may also be combined with a traditional TDD or FDD system to create a hybrid system. The multiple access technology mentioned herein can be of any special format such as Code Division Multiple Access (CDMA), Time Division Multiple Access (TDMA), Frequency Division Multiple Access (FDMA), Orthogonal Frequency Division Multiple Access (OFDMA), Multi-Carrier Code Division Multiple Access (MC-CDMA), or Carrier Sensing Multiple Access (CSMA).

Without loss of generality, OFDMA is employed herein as an example to illustrate different aspects of these embodiments.

FIG. 1 is a representative diagram of a wireless communication system with base stations (BS) 140 and mobile stations (MS) 150. A control server (CS) 120 controls one or multiple base stations (BS). Control server 120 is connected to the base stations via the backbone network 110. Control server 120 coordinates multimedia content broadcast, including terrestrial/mobile TV, for example, via a single frequency network (SFN) and cellular data unicast, such as voice-over-IP and internet traffic. In some embodiments, backbone network 110 is a packet data network that can either be a wired or a wireless network. Backbone network 110 may also connect to other servers in the system, such as multimedia content servers 130 and network management servers.

The geographic region serviced by the system may be divided into a plurality of cells, and wireless coverage may be provided in each cell by a base station. One or more mobile devices may be fixed or may roam within the geographic region. The mobile devices may be used as an interface between users and the network. A base station may serve as a focal point to transmit information to and receive information from the mobile devices within the cell that it serves by radio signals. A base station may be a macrostation that covers a large geographical area or a macro-cell, a micro or pico station that covers a small area or a micro/pico-cell, or a femto station that typically covers an indoor area or a femtocell. Those skilled in the art will appreciate that if a cell is divided into sectors, each sector can be considered as a cell. In this context, the terms "cell" and "sector" are interchangeable.

The transmission from a base station to a mobile station may be called a downlink (DL) and the transmission from a mobile station to a base station may be called an uplink (UL). The transmission may take place within a frequency range extending between two limiting frequencies. This range of frequency resource may be defined as an operating frequency band/channel or simply band in this text. The center of the frequency range is typically the center frequency or carrier frequency and the span of the frequency range is normally referred to as the bandwidth. For example, the frequency band for Broadcast Channel 36 in the United States is centered at 605 MHz with a bandwidth of 6 MHz. In another example, a 3GPP WCDMA system may use a 5 MHz DL band and a 5 MHz UL band.

Figure 2:
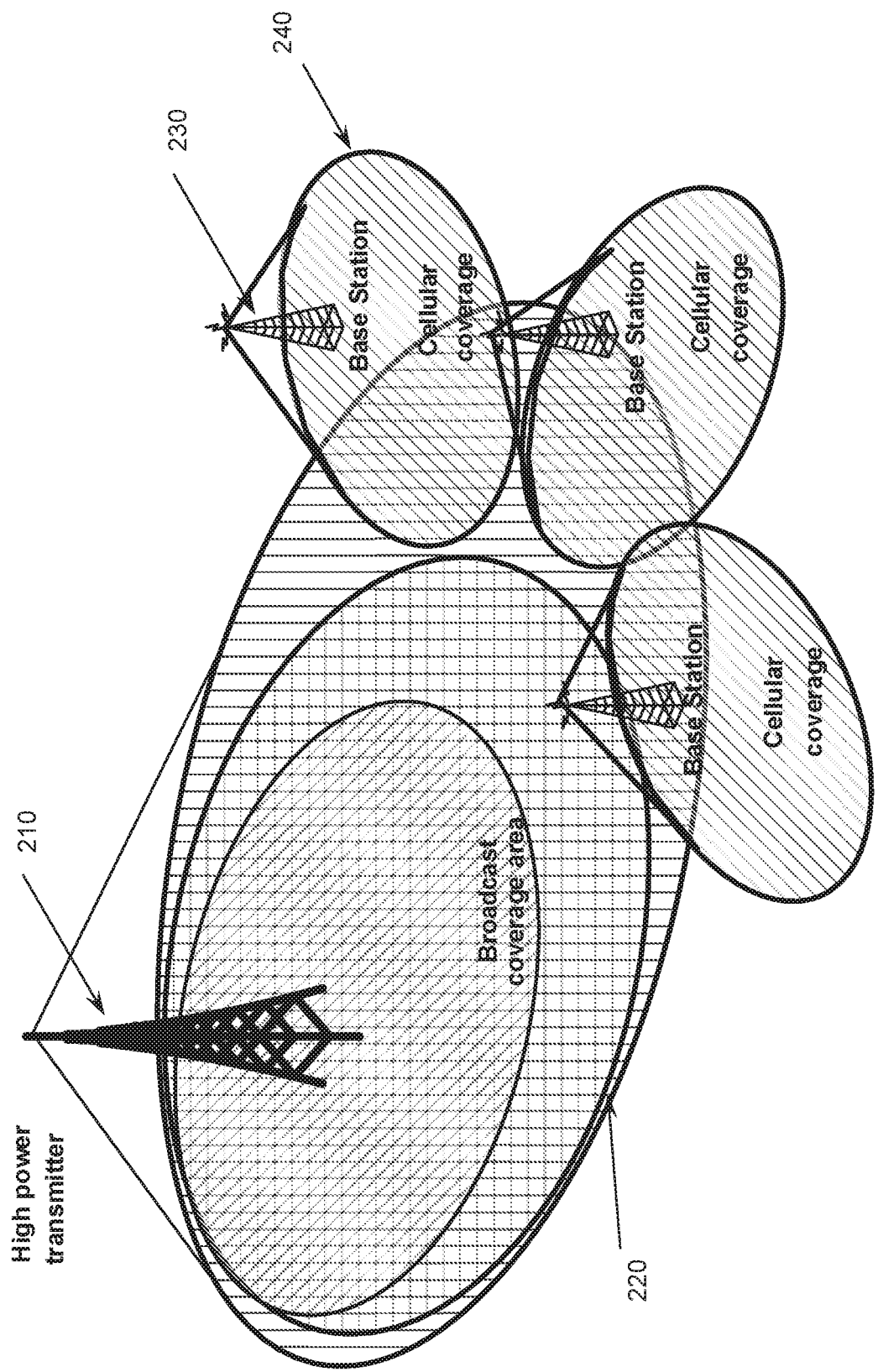
FIG. 2 depicts a scenario where a high-power broadcast system covering a large area overlays with the wireless communication system.
Figure 3:
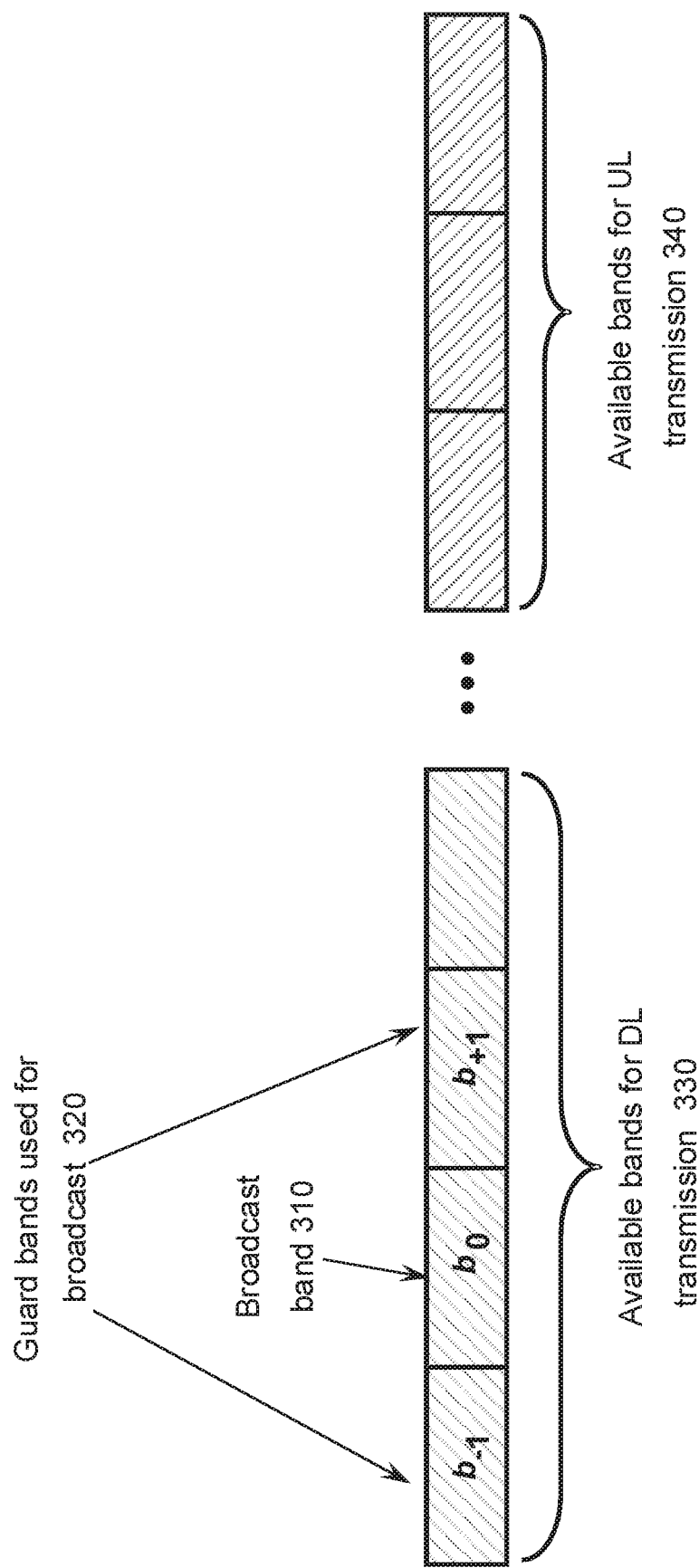
FIG. 3 depicts a case where a band used for high-power broadcast and its adjacent bands are used for DL transmission by the wireless communication system with designated UL bands.

High-power broadcast system 210 covering a large area 220 may overlap, to a certain extent, with the wireless communication system of multiple base stations 230 each of which covers an area 240, as illustrated in FIG. 2. The broadcast system, as an example, uses Band b0 310 for transmission and b−1 and b+1 as guard bands 320 (FIG. 3). These bands, along with adjacent bands (available DL bands 330), can be used for DL transmission for cellular or indoor wireless communication systems. The bands available for UL transmission 340 may be those that are not used for broadcast in the region of interest, those designated for other applications rather than high power broadcast (e.g., MMDS around 2.5-2.6 GHz), or simply those designated for UL transmission.

In accordance with aspects of certain embodiments disclosed herein, a wireless communication system may operate with a DL band chosen from a group or pool of bands designated for DL transmission and a UL band chosen from a group or pool of bands designated for UL transmission. A band in the DL pool does not necessarily have a fixed or predetermined one-to-one correspondence to or association with a band in the UL pool.

A control server may comprise components such as processors, memory banks, switches, routers, and interfaces. Together, these components enable the server to perform functions such as compressing and decompressing packet headers, removing and adding packet headers, segmenting and concatenating packets, and managing a database.

Figure 4:
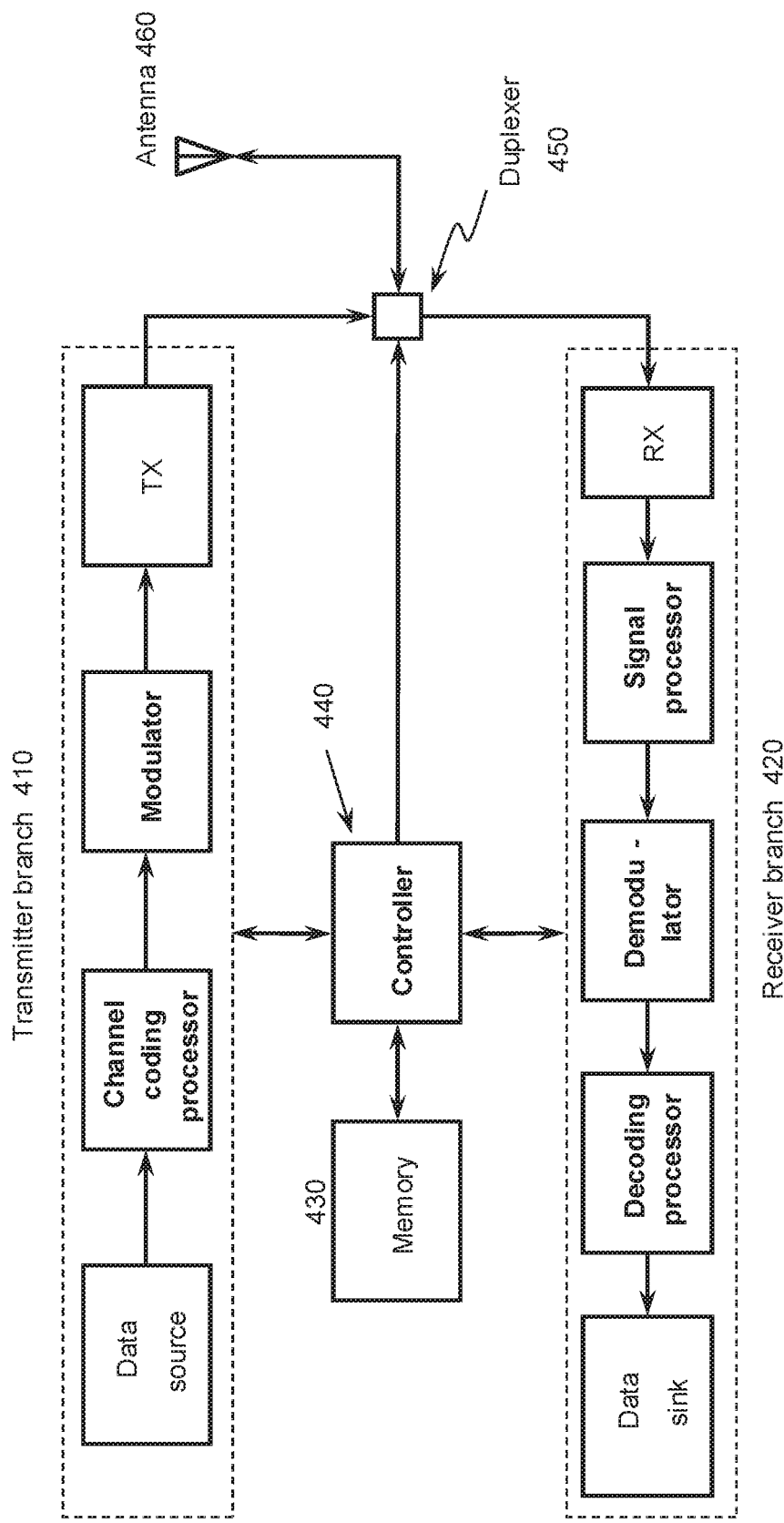
FIG. 4 is a block diagram of an example transmitter and receiver used in a base station or a mobile station of a wireless communication system.

FIG. 4 is a block diagram of a representative transmitter and receiver that may be used in base stations or mobile stations to implement a wireless communication link. A transmitter branch 410 comprises a channel encoding processor configured to perform functions such as data bit randomization, forward error correction (FEC) encoding, interleaving, and subchannel mapping. A modulator component is configured to apply modulation of a required modulation scheme and a radio frequency transmitter (TX) component is configured to transmit the signals.

A receiver branch 420 comprises an RF receiver (RX) component, signal processor, a demodulator component, and a channel decoding processor. The signal processor is configured to carry out various functions such as signal conditioning, ranging in a base station, and synchronization in both time and frequency by a mobile station. The demodulator is configured to demodulate the received signals. The channel decoding processor is configured to carry out functions such as channel compensation, de-interleaving, FEC decoding, and derandomization.

In addition to the transmitter and receiver, a controller 440, coupled with memory 430, is configured to control the operation of the transmitter and receiver, as well as the duplexer 450. Both the TX and RX consist of RF components such as filters, amplifiers, mixers, oscillators, and synthesizers. These components can be adjusted to operate at different center frequencies with various bandwidths. Duplexer 450 enables the RF duplex operation by connecting the transmitter to the antenna 460 and antenna 460 to the receiver while isolating the transmitter and receiver. The duplexer 450 may consist of a plurality of filters, circulators, isolators, couplers, and switches which can be manipulated to operate at different center frequencies with various bandwidths and at a FDD mode, a TDD mode, or a hybrid mode (i.e., FDD-TDD mode). The antenna is a multi-band antenna, which may be of different form factors or made up of different physical antenna elements.

Figure 5:
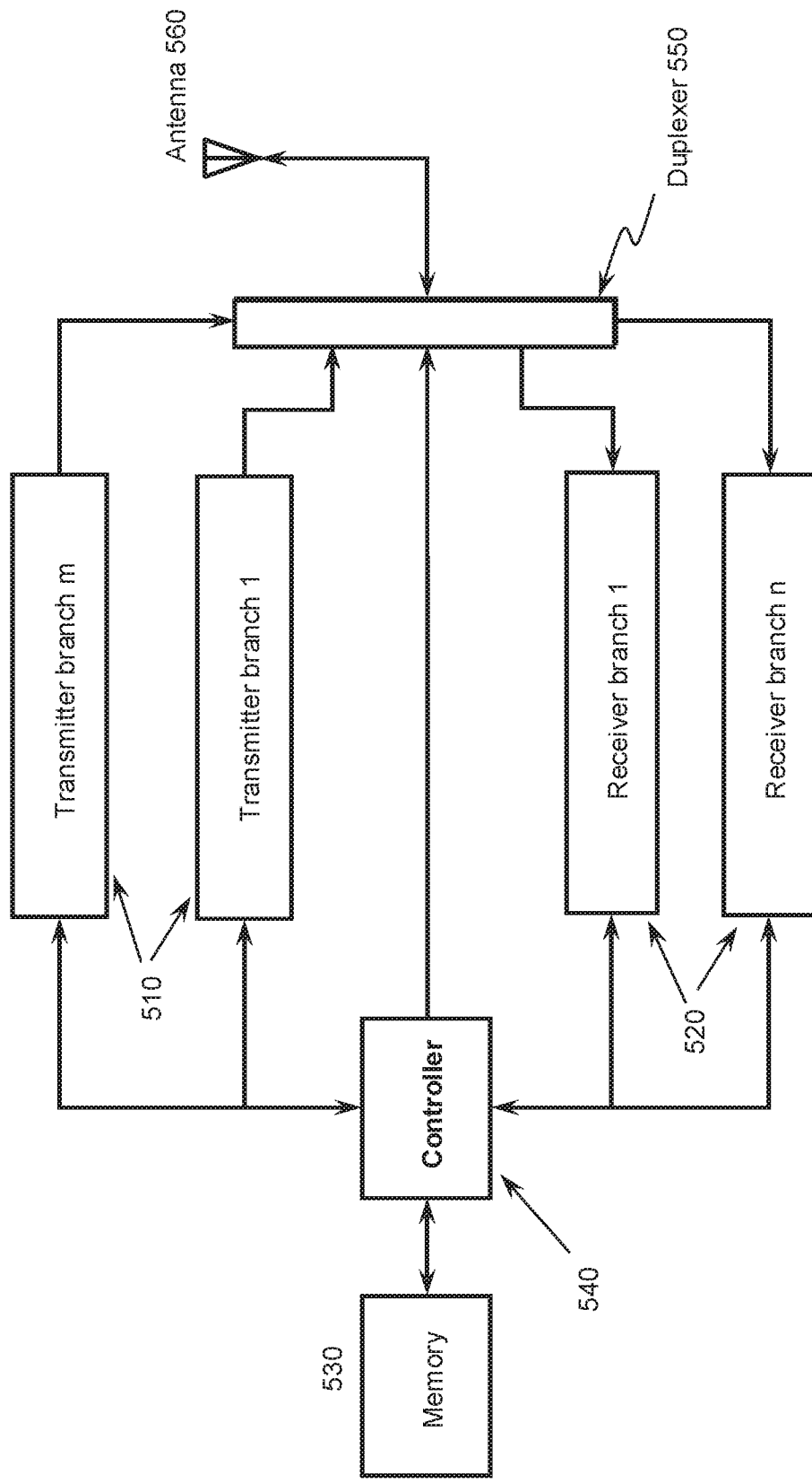
FIG. 5 is a block diagram of multiple transmitter branches and receiver branches.

Multiple transmitter branches 510 and/or multiple receiver branches 520 may be used by a base station or a mobile station in case where multiple bands are used in the DL and/or UL, as illustrated in FIG. 5. The number of transmitter branches is not necessarily the same as that of the receiver branches. The duplexer 550 is configured to provide connections and isolations between antenna, transmitter branches, and the receiver branches.

Those skilled in the art will appreciate that these components construct, transmit, and receive a communication signal containing the data. Other forms of transmitters or receivers may, of course, be used depending on the requirements of the communication system.

Figure 6:
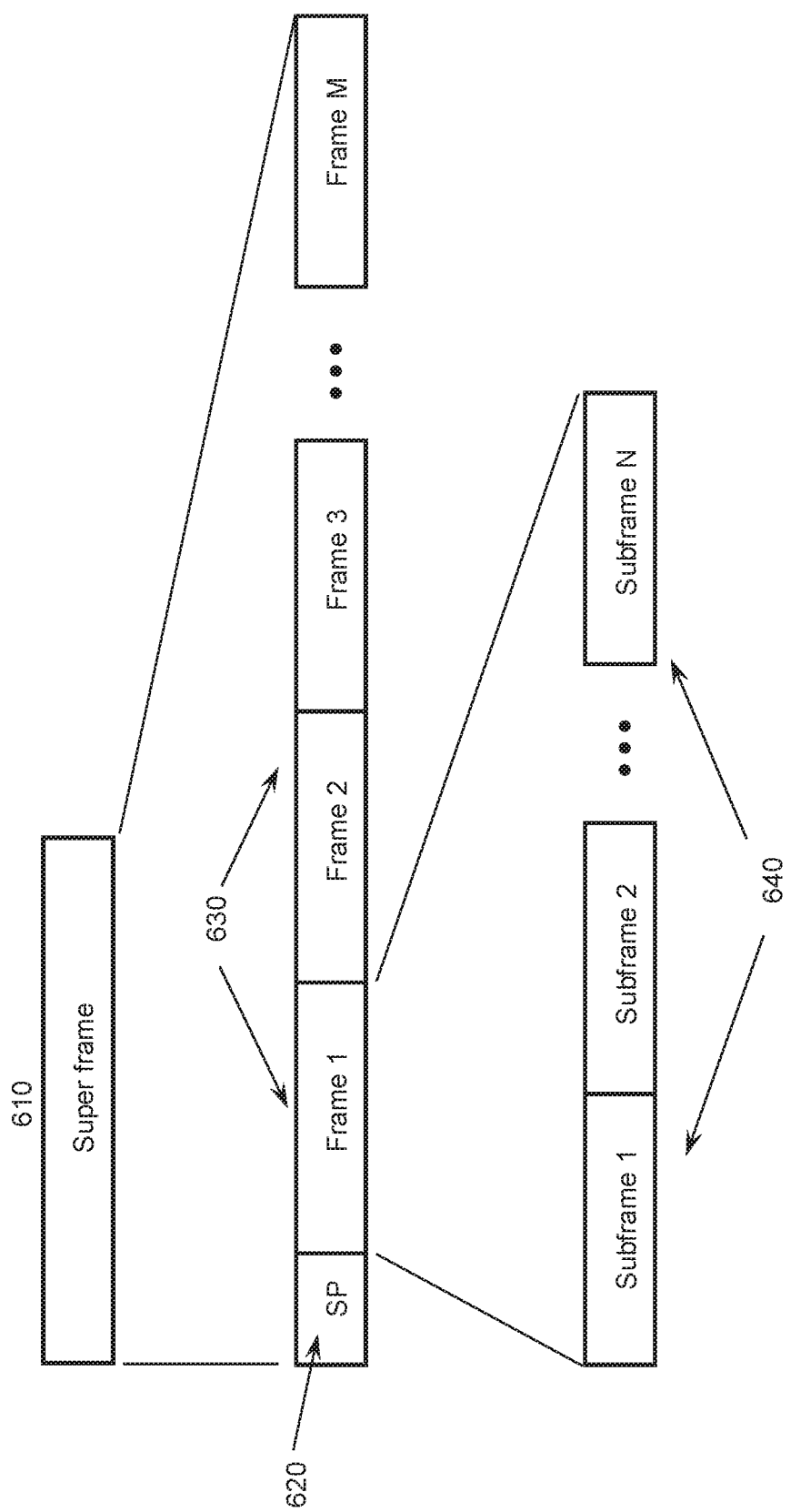
FIG. 6 is a graphical depiction of a radio frame structure in the time domain.

The wireless communication system may use a radio frame structure to facilitate the DL and UL transmission. For example, a radio frame 630 may consist of multiple (N) subframes 640, as shown in FIG. 6. In some embodiments, multiple (M) frames may form a super frame 610. In other embodiments, a subframe may be further divided into multiple time slots. Those skilled in the art will appreciate that the division of radio frames and its granularity are to facilitate radio transmission. Other forms of division or other nomenclature may, of course, be used depending on the requirements of the communication system.

The same structure of the transmission frame may be used by all of the cells within the system and frames may be transmitted in synchronization among the cells. Synchronization signals and/or reference signals may be embedded in each frame or subframe to assist radio operations.

A short period (SP) 620 may be inserted at some point of a super frame to provide information about the super frame. In FIG. 6, this short period may be placed at the beginning of a super frame, which can be used to transmit beacon, preamble, header, and/or other types of signaling for that super frame.

If an OFDM system is used, a subframe or time slot may further comprise one or more OFDM symbols. The OFDM time domain waveform may be generated by applying the inverse-fast-Fourier-transform (IFFT) of the OFDM signals in the frequency domain. A basic structure of a multi-carrier signal in the frequency domain may be made up of subcarriers that can be modulated to carry information data and reference signals. A copy of the last portion of the time waveform, known as the cyclic prefix (CP), may be inserted at the beginning of the waveform itself to form an OFDM symbol.

Figure 7:
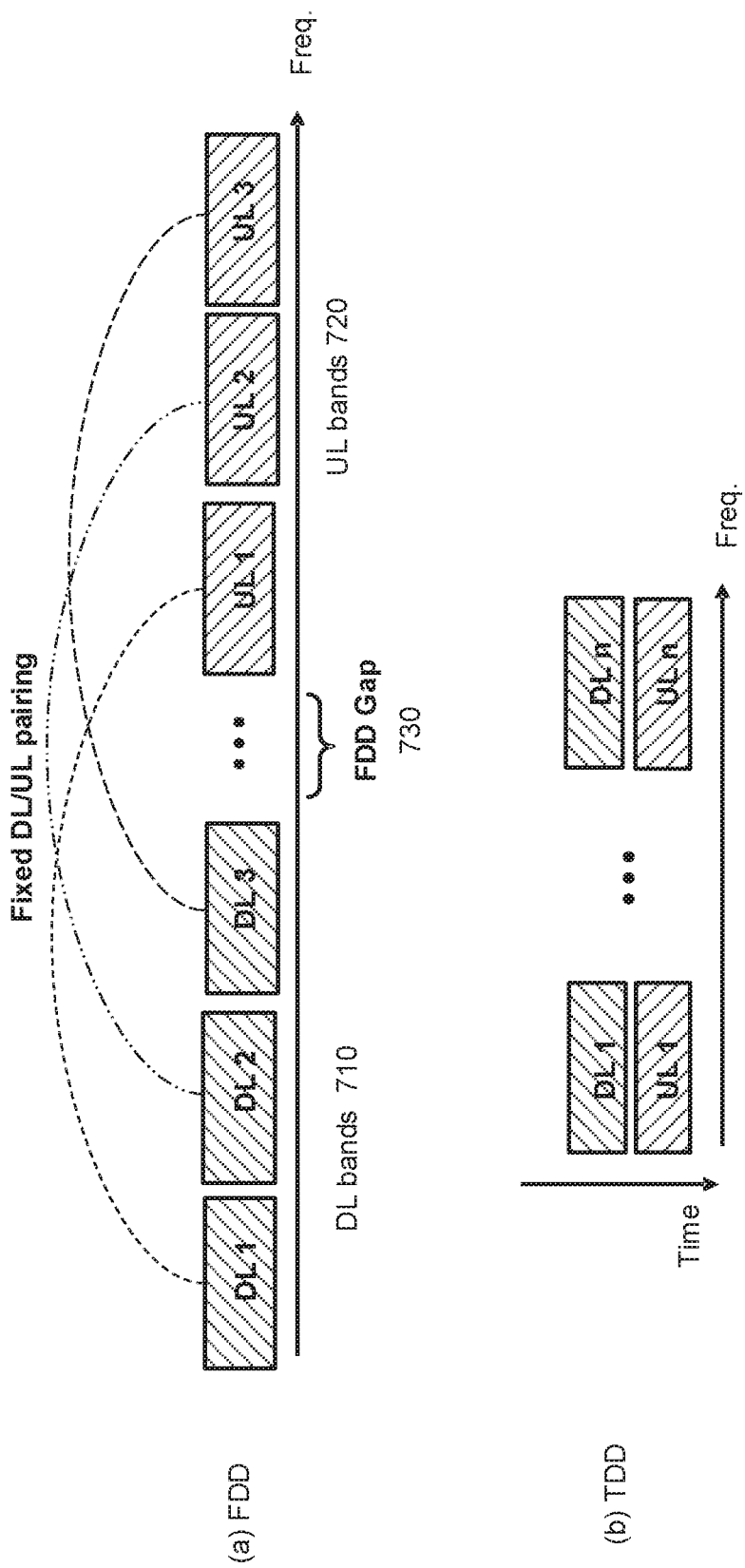
FIG. 7 is a graphical depiction of frequency-division duplex and time-division duplex.

In a frequency-division duplex (FDD) system, a frequency band may be designated for the DL transmission and a different frequency band for the UL transmission, as illustrated in FIG. 7(a). Using this pair of DL-UL frequency bands, bidirectional communication may be carried out between a base station and a mobile station. The DL 710 and UL 720 bands are typically separated by a sufficient gap 730 in frequency. Furthermore, the DL and UL bands may be tied or paired together in predetermined manner in a conventional FDD system This DL and UL band pairing or association is typically fixed and remains unchanged during operations. The pairing information is known to the base stations and mobile stations. Therefore, when a mobile station detects the DL signal, the mobile station can automatically determine the corresponding UL frequency band for use.

An FDD system can operate in a full-duplex mode or a half-duplex mode. In full-duplex mode, a base station or a mobile station may be configured to send and receive a transmission on both the DL and UL at the same time. In half-duplex mode, a base station (mobile station) is configured to either send on the DL (UL) or receive on the UL (DL) at any one time.

In a time-division duplex (TDD) system, a carrier frequency (or band) may be designated for both the DL and UL transmissions which take place alternating in time, as illustrated in FIG. 7(b).

Figure 8:
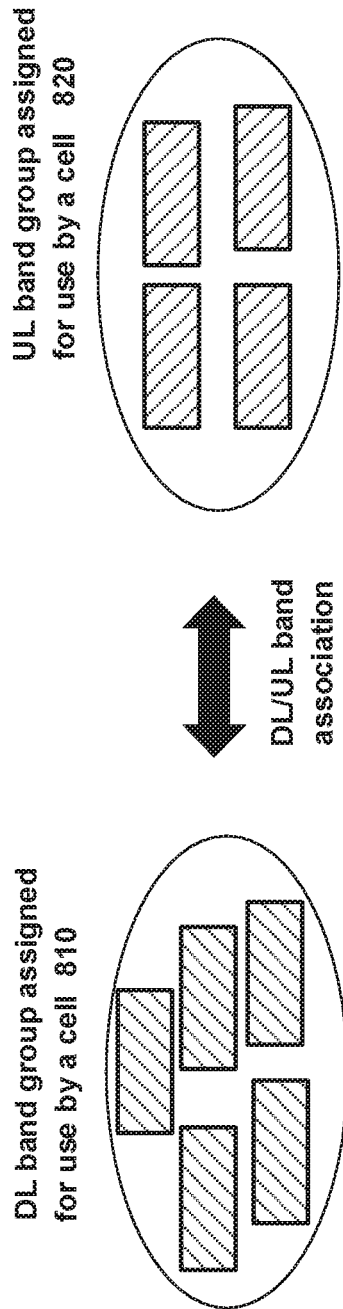
FIG. 8 is graphical depiction of flexible frequency-division duplex.
Figure 8:
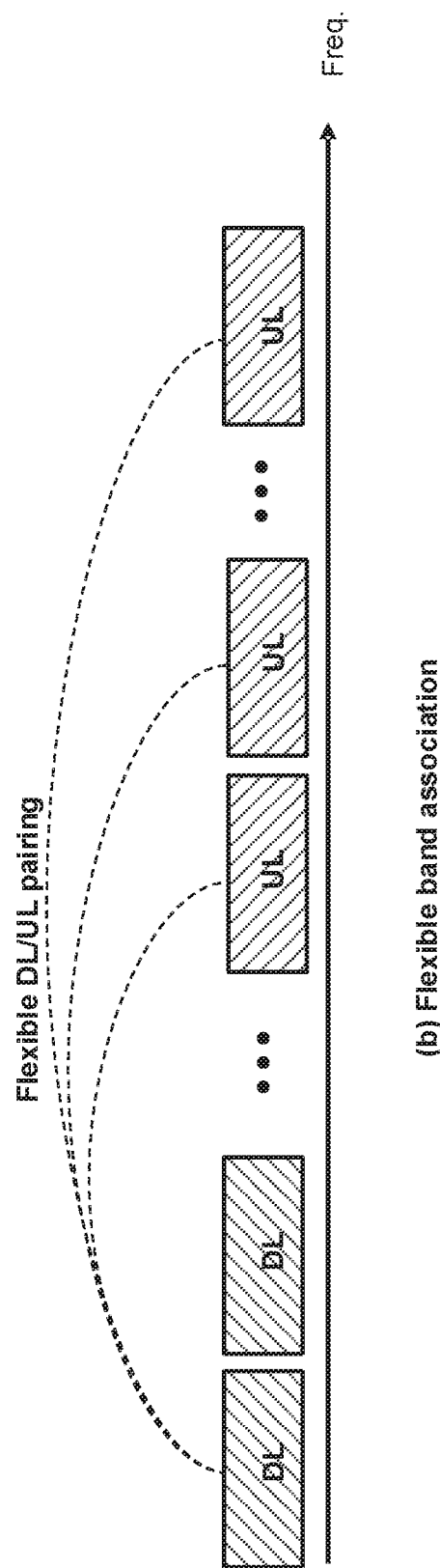

In accordance with aspects of certain embodiments of the present disclosure, a flexible frequency-division duplex (FFDD) system is provided that allows for improvements over conventional FDD or TDD systems where DL and UL association is fixed and predetermined. In embodiments of an FFDD system, the DL and UL band assignment and association may be flexible and/or dynamic, as depicted in FIG. 8, to carry out bidirectional communication between base stations and mobile stations. An FFDD system may allow for flexible frequency band allocation and configuration. In one embodiment, an FFDD system may operate with two groups of bands, the DL group of the bands designated for DL transmission 810 and the UL group of bands designated for UL transmission 820. The number of bands in each group may be different and the bandwidths of the bands in each group may be different or the same. A band in the DL group may be associated with any band in the UL group. Furthermore, a DL band may be associated with more than one UL band or multiple DL bands may be associated with a UL band. In one embodiment, a band may be chosen from the DL band group for DL transmission and a band may be chosen from the UL band group for UL transmission to establish a communication channel with a DL link and a UL link. In some embodiments, the assignment, association, and/or pairing of the DL and UL bands may be announced by special signaling.

A group of DL bands may be designated for a cell, while another group of DL bands may be designated for another cell. The DL band groups for different cells may be the same, overlapping, or completely different. Likewise, a group of UL bands may be designated for a cell, while another group of UL bands may be designated for another cell. The UL band groups for different cells may be the same, overlapping, or completely different.

FFDD operation typically uses DL signaling for the base stations or other signaling facilities, such as TV broadcasting stations, to provide mobile stations with information about corresponding UL bands or DL/UL band association. FFDD operation typically uses additional functions performed in base stations or mobile stations for some radio operations such as DL/UL band assignment, cell search, random access, and handoff.

Figure 9:
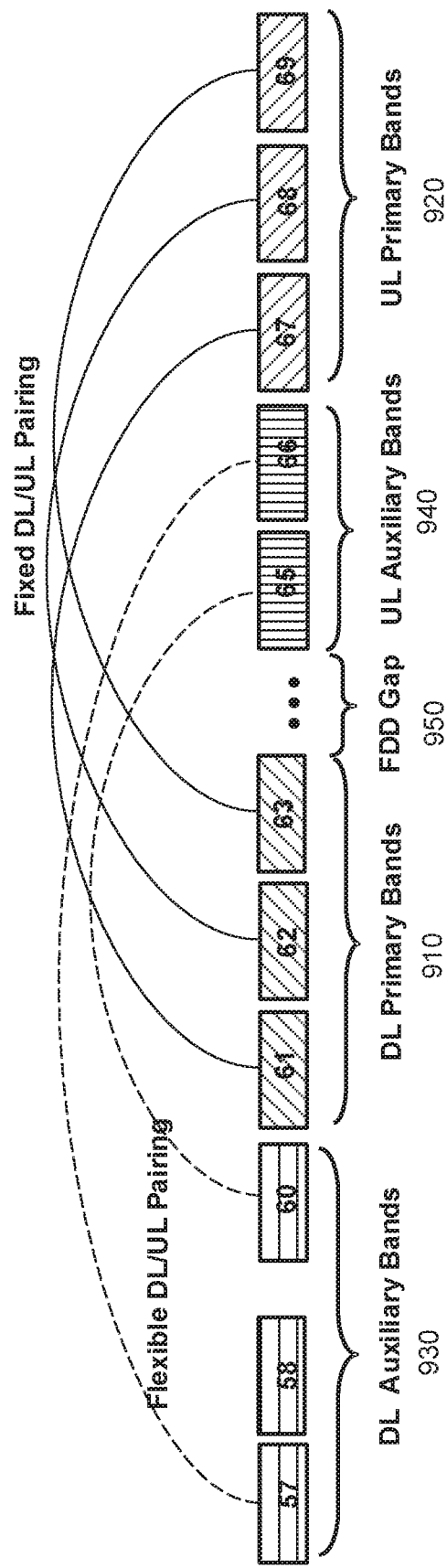
FIG. 9 is a graphical depiction of Primary Bands and Auxiliary Bands in the UHF range.
Figure 10:
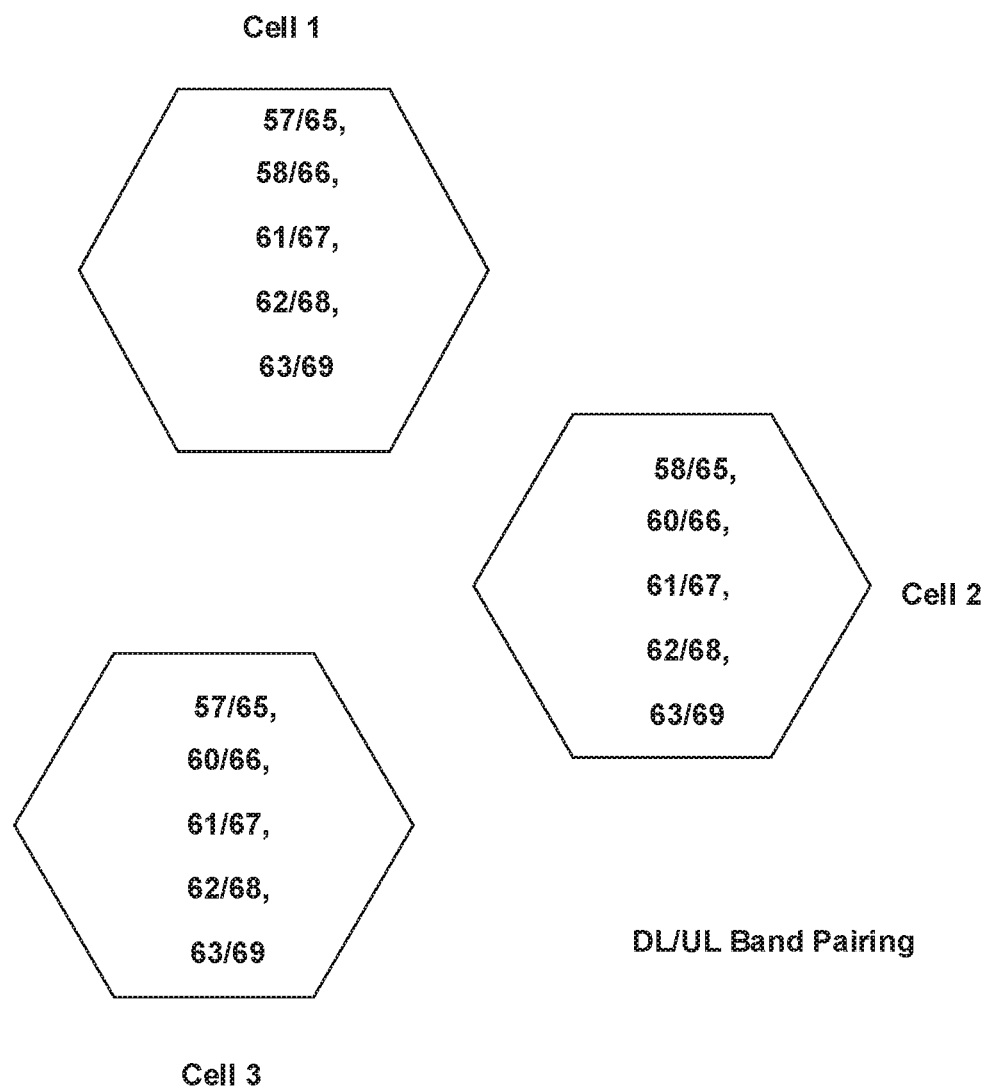
FIG. 10 is a graphical depiction of cell-specific Auxiliary Band pairing.

In some embodiments, a DL band group used by a cell may include a subgroup of DL Primary Bands 910 and a subgroup of DL Auxiliary Bands 930. A UL band group may contain a subgroup of UL Primary Bands 920 and a subgroup of UL Auxiliary Bands 940. A plurality of cells, or even all of the cells in a cellular network, may have a common subgroup of DL or UL Primary Bands. In some embodiments, different cells may have different subgroups of DL Auxiliary Bands 930 or UL Auxiliary Bands 940. In one embodiment, pairing of DL Primary Bands 910 and the UL Primary Bands 920 is relatively less flexible than the pairing of the DL Auxiliary Bands 910 and UL Auxiliary Bands 940. In one embodiment, the pairing of DL Primary Bands 910 and UL Primary Bands 920 is fixed, while the pairing of DL Auxiliary Bands 930 and UL Auxiliary Bands 940 is flexible, as depicted in FIG. 9 and FIG. 10.

Certain radio operations, such as the signaling of DL/UL band associations, may be carried out in the Primary Bands. The Primary Bands may exhibit lower frequency reuse with TV broadcasting systems or other cellular systems. Auxiliary Bands may exhibit higher frequency reuse, either with TV broadcasting systems or other cellular systems.

In one embodiment, the Auxiliary DL/UL band pairing or association is more dynamic and cell-specific, while the Primary DL/UL band pairing is fixed and cell-common. In the example depicted in FIG. 10, in Cell 1, the Auxiliary DL/UL band pairings are UHF bands 57/65 and 58/66; in Cell 2, the Auxiliary DL/UL band pairings are UHF bands 58/65 and 60/66; and in Cell 3, the Auxiliary DL/UL band pairings are UHF bands 57/65 and 60/66. The Primary DL/UL band pairing is common to the three cells: UHF bands 61/67, 62/68, and 63/69. In this example, UHF band 60 may be used for Digital terrestrial/mobile TV broadcasting in Cell 1, UHF band 57 may be used for Digital terrestrial/mobile TV broadcasting in Cell 2, UHF band 58 may be used for Digital terrestrial/mobile TV broadcasting in Cell 3, and UHF band 59 may be used for high-power Digital terrestrial/mobile TV broadcasting in a super cell that covers Cell 1, Cell 2, and Cell 3. The UHF bands 61, 62, 63 are dedicated for use in the cellular data network. The UHF bands (typically 6 or 8 MHz) may be reorganized to fit with the bandwidth of 3GPP LTE systems (typically 5, 10, or 20 MHz) and the DL and UL band groups may be redefined to carry out the operations in accordance with the embodiments of the present invention.

In some embodiments, the Primary Bands may be assigned to a group of selected cells. On other embodiments, the Auxiliary Bands may be used in a relatively dynamic manner. For example, there may be fewer restrictions on the assignment and association of an Auxiliary Band.

In one embodiment, a plurality of DL Primary Bands may be used for data unicasting, while a plurality of DL Auxiliary Bands may be used for multimedia broadcasting or multicasting. These DL Auxiliary Bands may be not paired with any UL bands.

Figure 11:
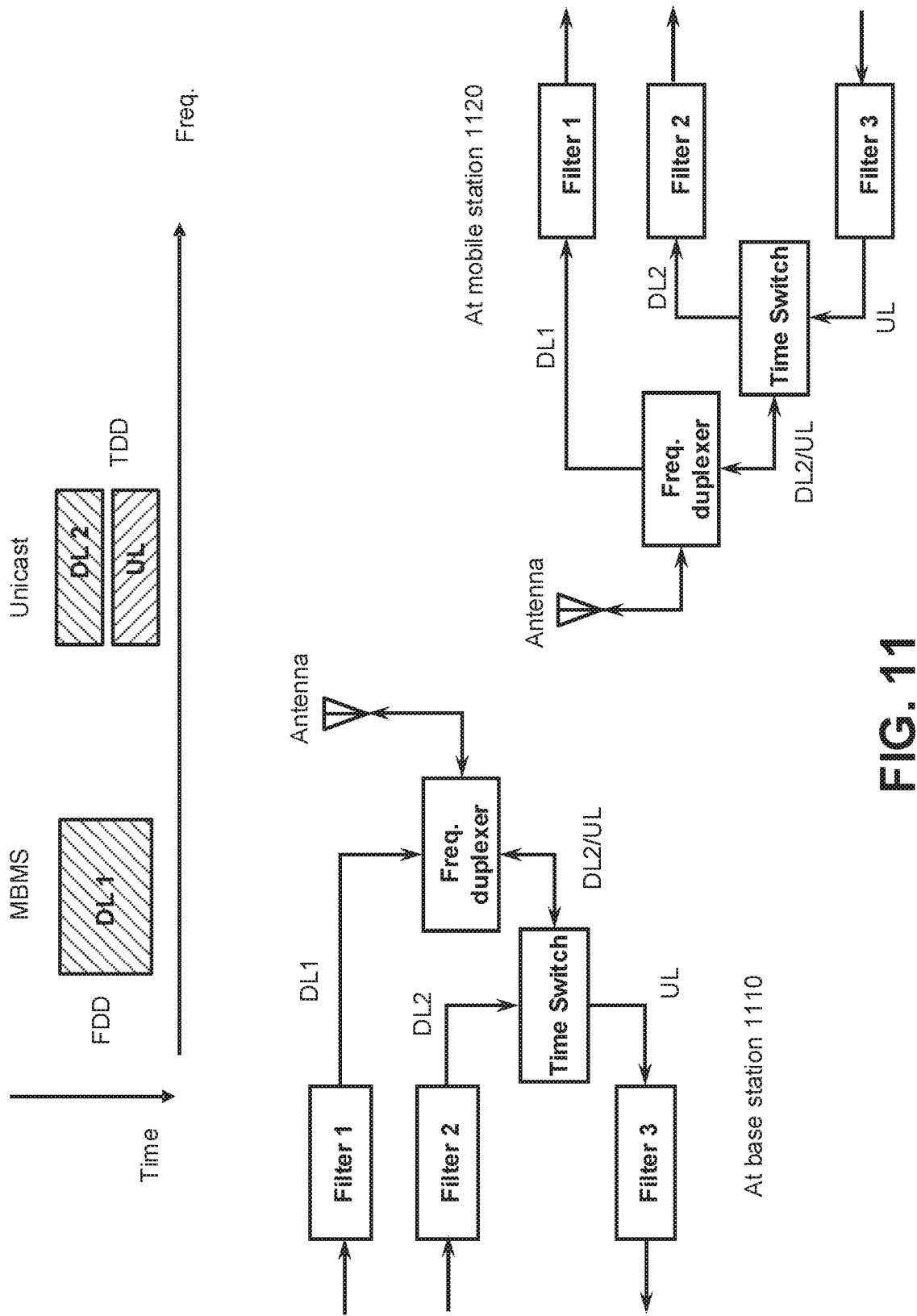
FIG. 11 is an example of hybrid FDD-TDD operation.

In one embodiment depicted in FIG. 11, one band (DL1) is used for a first DL transmission and another band (DL2/UL) is used for a second DL transmission and a UL transmission. The DL1 band may be used for multimedia broadcasting/multicasting (MBMS), while the DL2/UL band may be used for DL and UL unicasting in a TDD mode. Therefore, the overall system operates in a hybrid FDD-TDD mode. The RFTX or RFRX in each transmitter or receiver branch may employ a filter bank that includes a plurality of filters, each of which may have a specific pass-band and can be activated or deactivated as needed. One or more filters may be activated to form a pass-band. In this example, Filter 1, Filter 2, and Filter 3 at the base station 1110 may be activated to pass the corresponding frequency bands. A time switch may be used for the TDD operation between DL2 and UL, whereas a frequency duplexer may be used for the FDD operation between DL1 and DL2/UL. Similarly at the mobile station 1120, Filter 1, Filter 2, and Filter 3 may be activated to pass the corresponding frequency bands. A time switch may be used for the TDD operation and a frequency duplexer may be used for the FDD operation.

Figure 12:
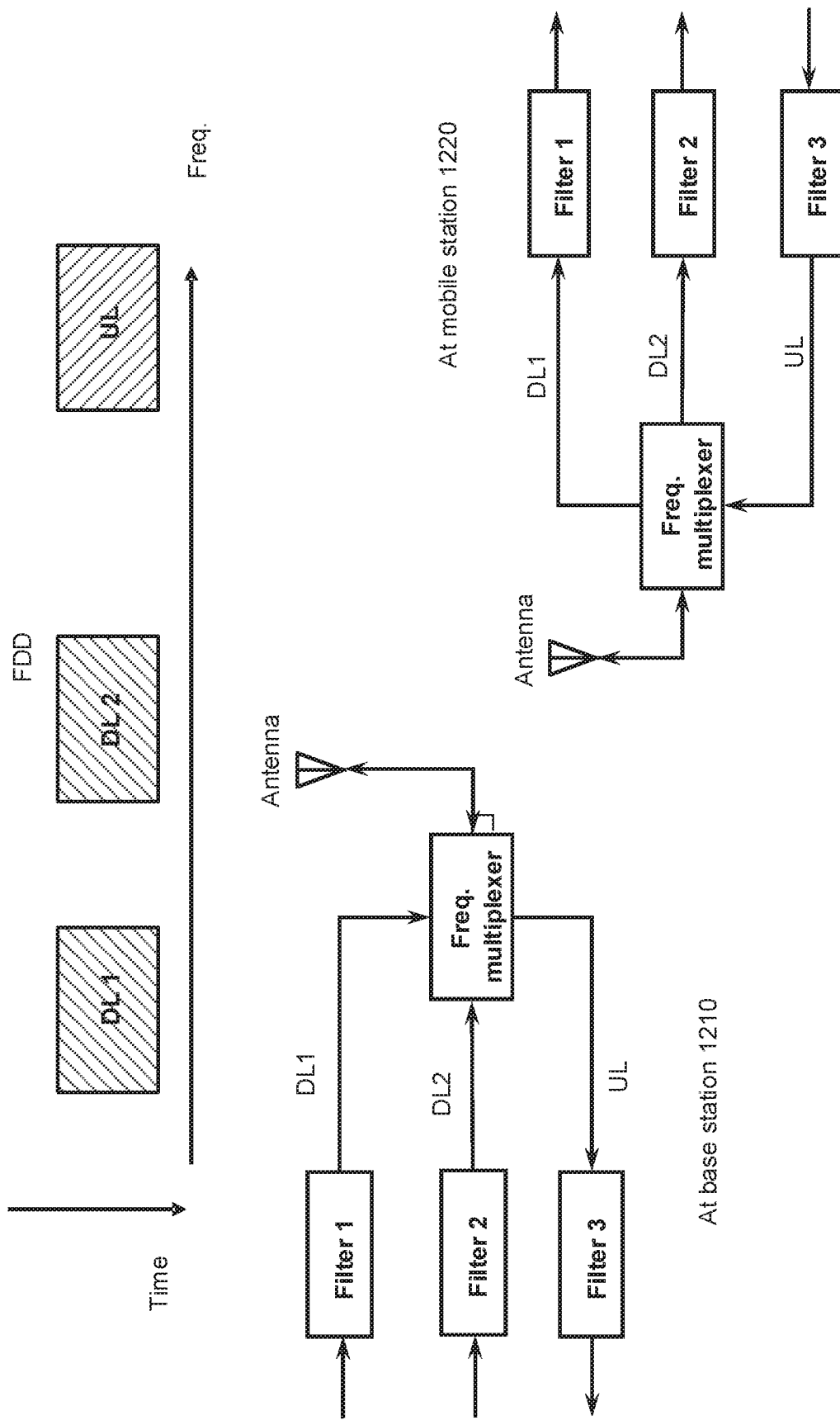
FIG. 12 is an example of multi-band FDD operation.
Figure 13:
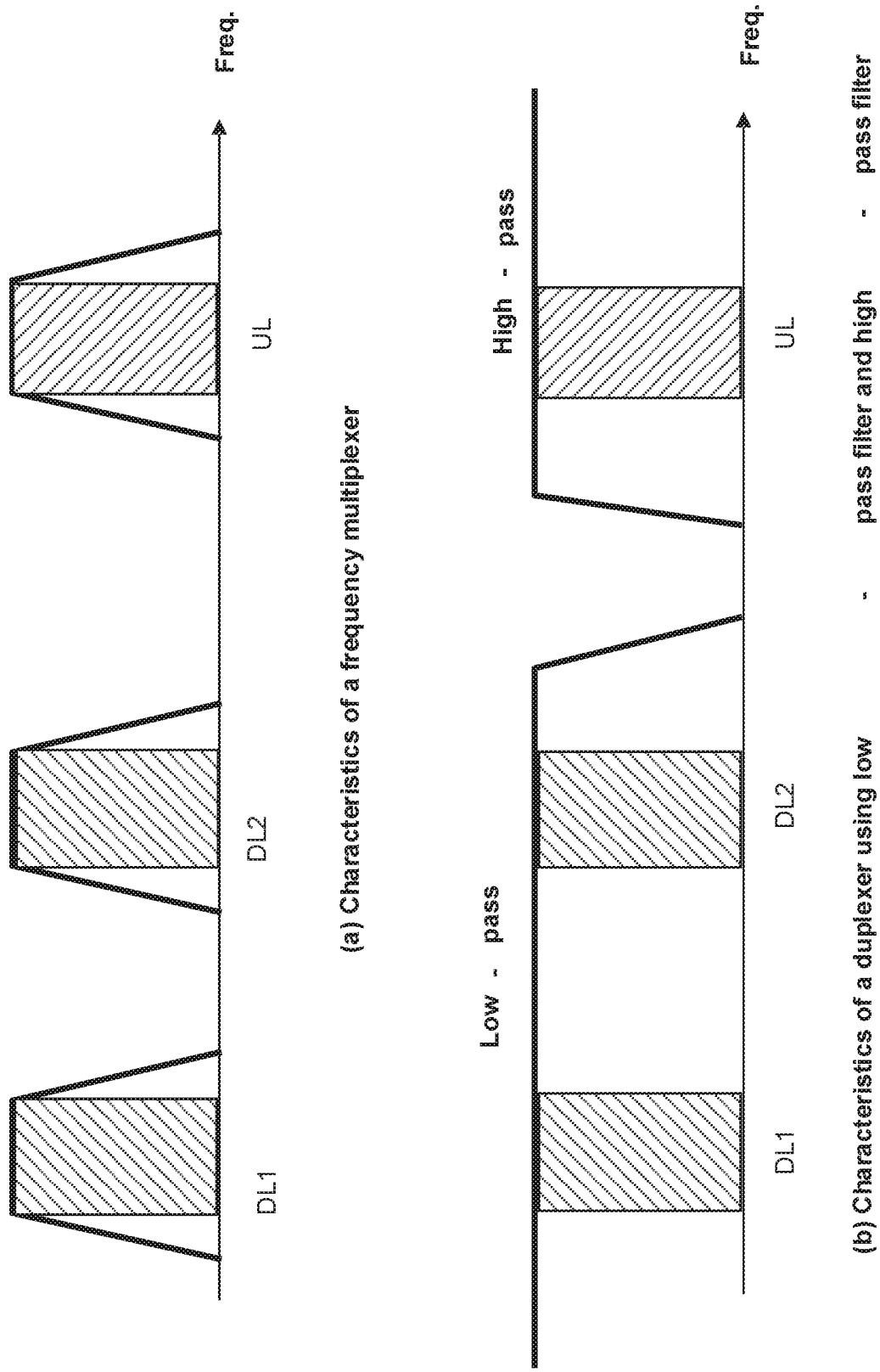
FIG. 13 illustrates characteristics of a frequency multiplexer and a frequency duplexer with low-pass filter and high-pass filtering.

In another embodiment depicted in FIG. 12, two DL bands (DL1 and DL2) and a UL band may be used for communication in a FDD mode. Filter 1, Filter 2, and Filter 3 at the base station 1210 may be activated to pass the frequency bands corresponding to DL1, DL2, and UL. The duplexer used for the FDD operation can be realized using a frequency multiplexer employing a bank of a plurality of filters, each of which has a specific pass-band and can be activated or deactivated as needed. One or more filters can be activated to form a pass-band. In this case, three individual pass-bands are created as depicted in FIG. 13(a). The duplexer can also be implemented using two non-overlapping frequency filters, one low-pass and the other high-pass, if the possible DL bands are in the lower range of the spectrum and the possible UL bands are in the higher range of the spectrum, as depicted in FIG. 13(b). Similarly, at the mobile station 1220, Filter 1, Filter 2, and Filter 3 may be activated to pass the frequency bands corresponding to DL1 and DL2/UL and a duplexer may be used for the FDD operation.

With the flexibility of FFDD systems, the frequency reuse plan for DL may be different from the frequency reuse plan for UL. In some embodiments, the reuse plan may be changed in time.

Figure 14:
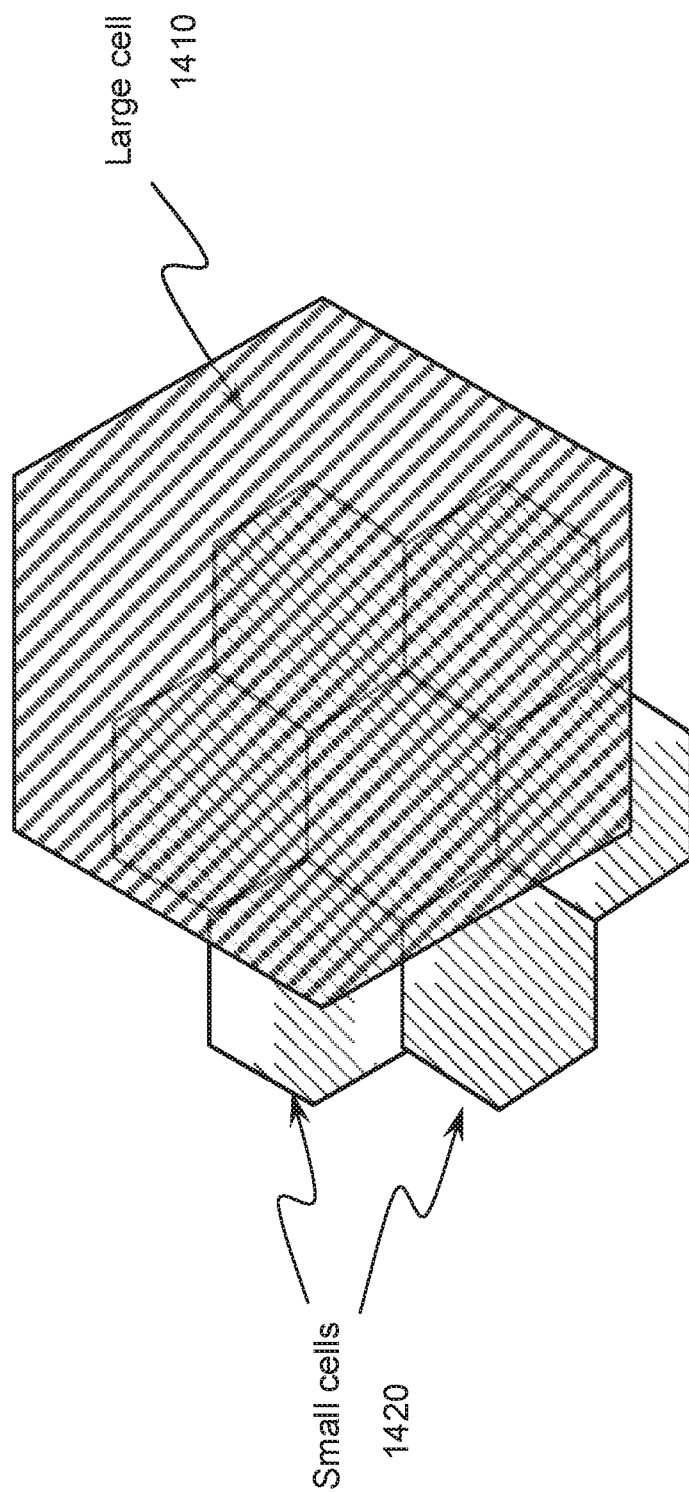
FIG. 14 is a graphical depiction of a large cell overlaying over multiple small cells.

In some embodiments, the cell size for DL and UL may be different as depicted in FIG. 14. For example, a DL (or UL) band may be used for a larger cell 1410 by a base station and a UL (or DL) band may be used for a smaller cell 1420 by another base station. Thus, a mobile station may be served by two different base stations, one for DL transmission and the other for UL transmission. The serving base stations may be connected through a wired or wireless backbone link and exchange control information and data information via the backbone link. The control information may include radio resource request and allocation information, modulation and coding information, channel feedback, and packet acknowledgement (ACK) or non-acknowledgement (NACK). The data information may include internet data or multimedia data such as voice or video packets.

In some embodiments, a DL band may be associated with multiple UL bands. For example, the DL band may be used for a large cell and the multiple UL bands may be used for multiple small cells. That is, these UL bands may be used separately as in the example depicted in FIG. 15(a). If the UL bands are contiguous, they can be aggregated together to form a wider UL band that is associated with a DL band, as depicted in FIG. 15(b).

Figure 15:
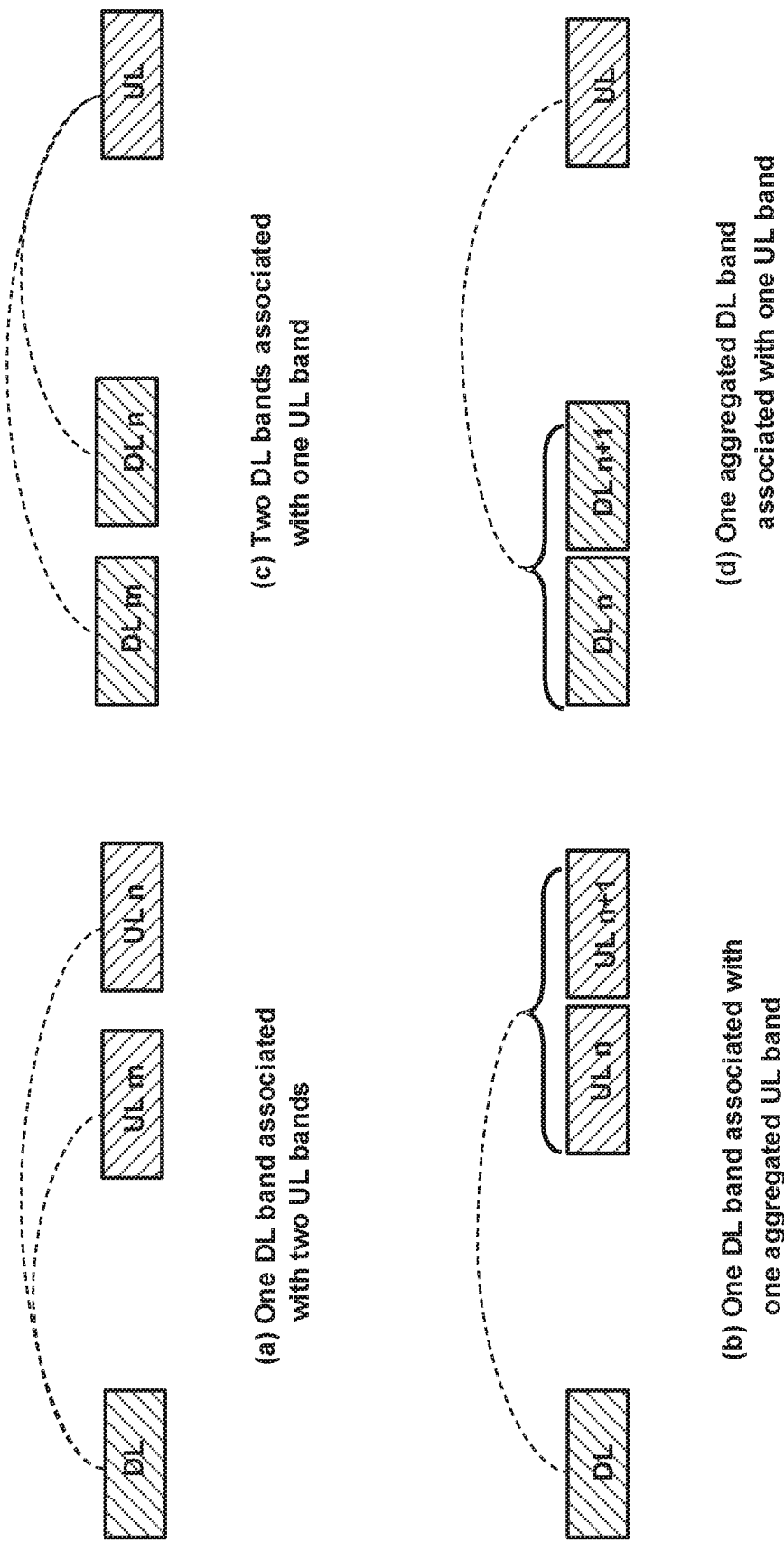
FIG. 15 is a graphical depiction of various DL/UL band associations.

Similarly, multiple DL bands may be associated with a UL band, as depicted in FIG. 15(c). For example, the DL bands may be used for multiple small cells, and the UL band may be used for a large cell for UL transmission by the mobile stations in these small cells. If the DL bands are contiguous, they can be aggregated together to form a wider DL band to meet the need of a specific application. For example, the wider DL band may be used in a group of small cells for SFN broadcast. In this case, the wider DL band may be associated with a UL band, as depicted in FIG. 15(d).

If the bandwidths of a DL band and a UL band are different, as in the example of an aggregated band associated with a normal band, the structure of the signal on the wider band may be adapted to accommodate the wider bandwidth.

In some embodiments, the subcarrier spacing in the OFDM symbol may be increased proportionally to the increase in bandwidth while keeping the number of subcarriers (i.e., same FFT length) unchanged, thereby resulting in shorter OFDM symbols in time length. Alternatively, the number of subcarriers in the OFDM symbol or the FFT length may be increased proportionally to the increase in bandwidth while keeping the subcarrier spacing, and thus the symbol length, unchanged.

In other embodiments, to carry out multimedia content broadcast and cellular data unicast, some subframes may be dedicated for SFN broadcast and others for data unicast (including cell-specific control channels). In such cases, information on the UL band used in a cell may be provided by the base station for that cell through the unicast subframes. A subframe may not necessarily be exclusively assigned for SFN broadcast or data unicast. For instance, in a subframe, one or more OFDM symbols can be allocated for data unicast and the rest of OFDM symbols can be allocated for SFN broadcast. In this case, information for the UL band can be provided via the unicast symbols.

Figure 16:
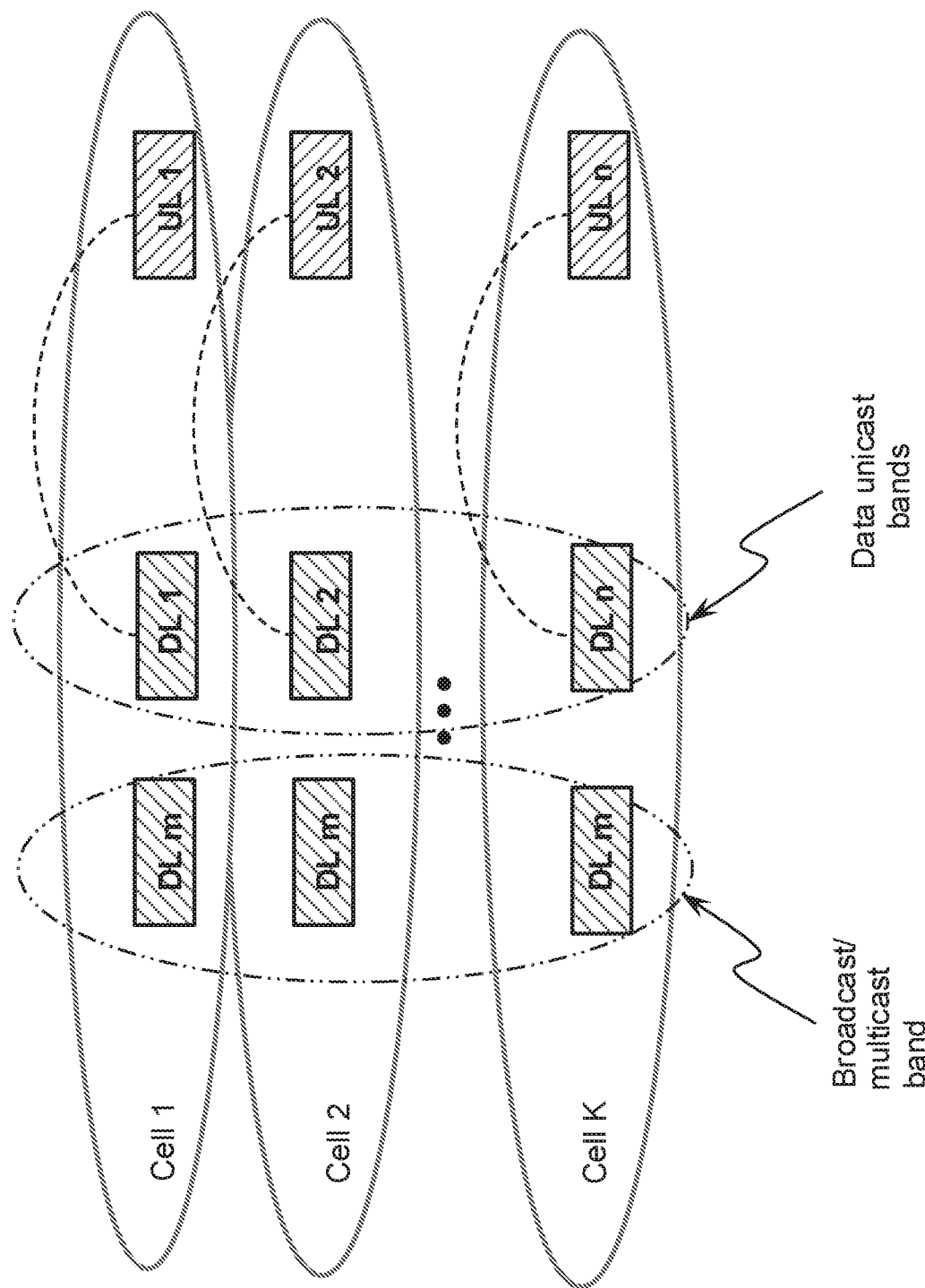
FIG. 16 depicts a scenario in which in a group of K cells, two DL bands are allocated to each cell, one for broadcasting or multicasting and the other for data unicasting.

In further embodiments, multiple bands may be used by individual base stations. For example, FIG. 16 depicts an example in which for a group of K cells, two DL bands are allocated to each cell. One DL band (e.g., DLm) is common to all cells in the group and may be used for multimedia content broadcast in a SFN form by this group of cells. The other DL band may be used for data unicast within a frequency reuse plan among this group of cells.

Figure 17:
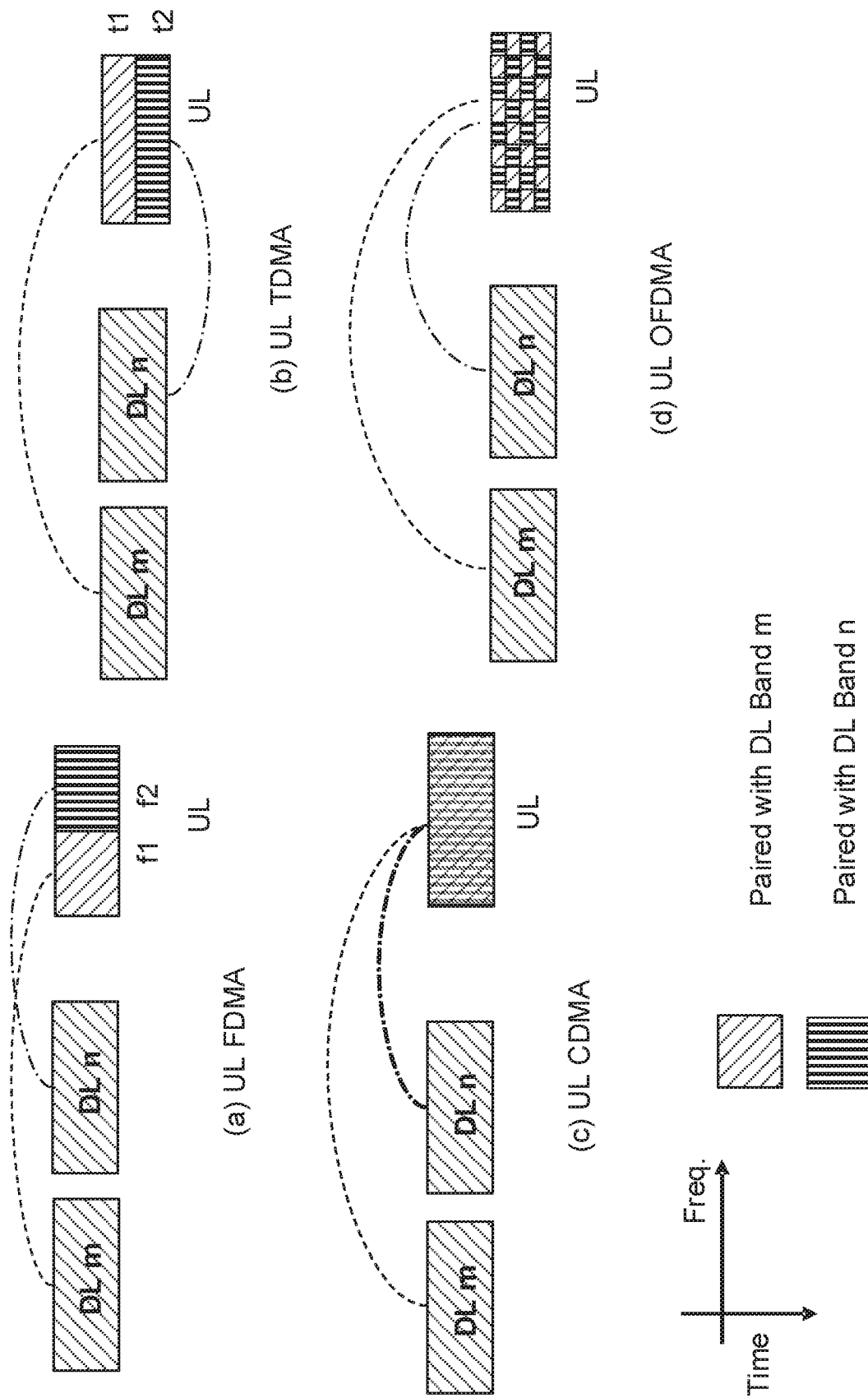
FIG. 17 is a graphical depiction of multiple DL bands paired with a UL band using UL FDMA, TDMA, CDMA, and OFDMA.

In some embodiments, a UL band may be paired with multiple DL bands through different types of UL multiple access methods, such as FDMA, TDMA, CDMA, and OFDMA as depicted in FIG. 17. In TDMA, the UL band may be divided into multiple (not necessarily equal) segments in time and each segment may be allocated to pair with a DL band to establish a bi-directional communication link. In FDMA, the UL band may be divided into multiple (not necessarily equal) segments in frequency and each segment may be allocated to pair with a DL band. In CDMA, codes may be arranged into multiple sets and each set may be allocated to pair with a DL band. In OFDMA, time-frequency transmission units (e.g., sub carrier blocks or subchannels) may be organized into different sets and each set may be allocated to pair with a DL band. Such multiple access and sharing mechanisms may be coordinated by the control server or negotiated upon among the sharing base stations.

In some embodiments, a DL signal, such as a beacon, may be transmitted by one or more base stations to indicate the frequency reuse plan for DL and/or UL. Possible frequency reuse plans can be pre-determined and tabulated in a lookup table, for example. A lookup table may be made available to the base stations and mobile stations and the lookup table information may be stored by the base stations and mobile stations. A specific reuse plan may be indicated by an index in the lookup table and the index may be carried by the DL signal.

In other embodiments, during DL transmission, a signal or signals may be broadcast by one or more base stations to provide information about the assignment of DL and UL bands for one or more cells. The information may further indicate the pairing of a DL band and a UL band in one or more cells. The information may also indicate the pairing of multiple DL bands and UL bands in one or more cells.

In some embodiments, DL/UL band pairs or associations for one or more cells may be specified by centralized signaling via a DL Primary Band or in each DL band. Additionally and optionally, DL/UL band pairs or associations for one or more cells may be specified by centralized signaling by a cellular base station or a super station (e.g., TV broadcasting tower). Alternatively, the association of a DL band and its corresponding UL band in a cell may be specified by distributed signaling; that is, the DL signaling on that DL band may indicate its pairing UL band.

A periodic signal (e.g., a preamble in the short period of a super frame or synchronization signals in a frame) may be broadcast by a base station to signify the DL band that it is currently using. Such a signal may be designed to carry some distinctive characteristics to facilitate the mobile station to lock on to the DL band. This signal may also carry the information specifying the association between a DL band and a UL band, or a separate signal may be used to carry the same information. The signals can be transmitted per subframe or per time slot.

The association between a DL band and a UL band can also be specified as a message embedded in a control or data subchannel, preferably with some level of error-protection coding. Additional information may be provided together with the DL/UL paring information. In the message, bit fields of different lengths may be reserved for specifying all or some of the following information entities in a specific format (not necessarily in the same order):

cell identity identity of the serving cell
identity of neighboring cells
frequency band pairs:
   DL I ULJ (or association index I);
      sub frame numbers or time of use for TDMA UL band sharing (optional) DL2, UL2 (or association index 2)
      subframe numbers or time of use for TDMA UL band sharing (optional)
   capacity load (level of cell traffic congestion)

In systems employing FDMA, CDMA or OFDMA, one of the following lines may be used to replace "sub frame numbers or time of use for TDMA UL band sharing (optional)" above:
sub band numbers for FDMA UL band sharing (optional)
code set numbers for CDMA UL band sharing (optional)
or
subchannel numbers for OFDMA UL band sharing (optional).

The above information message may be implemented as a string of bits and can be compressed using an information compression technique. The message may also be multiplexed with other control messages into a bitmap, possibly using an information compression technique. A cyclic redundancy check attachment may be added to the message before being channel-coded and modulated. The modulated information symbols may be mapped to OFDM subcarriers in a control or data subchannel, in a header, or in a preamble for transmission.

Possible DL/UL band associations may be anticipated and tabulated in a lookup table such as the one shown below, which may be made available to both the base stations and mobile stations for local storage. For example, a control server may distribute the table via a backbone network to base stations and the base stations may forward the table to mobile stations on a broadcast or control subchannel. A particular association may be specified by an index in the lookup table which corresponds to a particular DL band within the DL band set and a particular DL band within the UL band set.

| DL/UL association index | DL band # | UL band # |
| --- | --- | --- |
| 0 | 1 | 1 |
| 1 | 2 | 2 |
| 2 | 3 | 3 |
| 3 | 1 | 1, 3 |
| 4 | 1, 3 | 2 |
| 5 | 2 | [1, 2] aggregated |
| 6 | [2, 3] aggregated | 1 |
| 7 | Reserved | Reserved |

In some embodiments, a DL preamble, mid-amble, or post-amble in a frame or super frame may be used to specify one or more random access channels in an aggregated UL band or shared UL band. A DL header of a frame or DL message in a control or data channel may be used to indicate sub-channel assignments in a UL band, especially in an aggregated UL band or shared UL band.

In other embodiments, a base station may periodically broadcast advertisement messages to provide mobile stations hand-off information, including information regarding DL and/or UL bands in neighboring cells. For example, the advertisement message may include pairing information of a DL band and the corresponding UL band, or pairing information of DL bands and corresponding UL bands in one or more neighboring cells. A mobile station may use the advertisement message to identify the DL and UL frequency band pairs in the neighboring cells and to expedite the hand-off process.

A group of DL bands and a group of UL bands may be made available by designating these bands for a system to use in a specific geographical region. The availability of DL bands and UL bands in specific geographical region may also be indicated by an information database.

In some embodiments, a central processor (e.g., a control server) may assign an available DL band to a base station as well as the corresponding UL band. Alternatively, individual base stations may independently determine which available DL bands along with the associated UL bands to use. The individual base stations may make this determination by, for example, negotiation among themselves, or self-organization methodologies.

When determining which available DL and UL bands to be assigned to a base station in a cell, the central processor (or the controller in a base station) may take into account one or more of the following factors:
1. Interference levels that the mobile stations experience on a DL band
2. Interference levels that a base station experiences on a UL band
3. Types of applications
4. QoS requirements for the DL transmission
5. QoS requirements for the UL transmission
6. DL modulation and coding schemes (MCS) and UL MCS
7. Spatial processing methods for DL and UL
8. Transmit power levels Some of the above information may be obtained through cell survey and cell planning before or during the build-out and operation of a cellular network and may be provided to a control server and one or more base stations.

In some embodiments, the processor may process jointly or independently the information related to these factors to determine which DL and UL bands are to be used by the base station. For example, the processor may pair up the DL and UL bands with a similar interference level for similar types of DL and UL data traffic. In some cases where the DL signals are relatively robust (e.g., in a SFN broadcast application), UL interference level may be a primary factor for choosing a UL band.

In other embodiments, an imbalance in the interference level between the DL and UL bands may be compensated for by using different MCS and/or transmission power control for the DL and UL transmission.

To determine the interference level on a UL band, a base station may detect interfering signals in the time or frequency domain and evaluate the average interference level or an equivalent noise level.

To determine the interference level on a DL band, the base station may aggregate the interference information fed back from the mobile stations under its service coverage and to obtain an average interference level or an equivalent noise level.

A base station may share or exchange its interference information via a wire or wireless medium with other base stations, especially with those base stations of its neighboring cells. The base station may also send the interference information to the control server. The control server may establish a database or record of interference for each DL and UL band based on the information sent from each base station. Such a database can be used as a basis for DL/UL band assignment.

A mobile station may assess the interference it experiences from other transmitters on a DL band used by the mobile station. The mobile station may determine the DL interference level by detecting the interfering signal in the time or frequency domain and transmit the interference information to its DL serving base station.

In a cellular wireless communication system, a cell search procedure may be used by a mobile station to acquire time and frequency synchronization within a cell and detect the cell identity. In the FFDD system, the cell search procedure may be coupled with functions such as searching for the DL band for a cell and obtaining the information on the pairing UL band.

Figure 18:
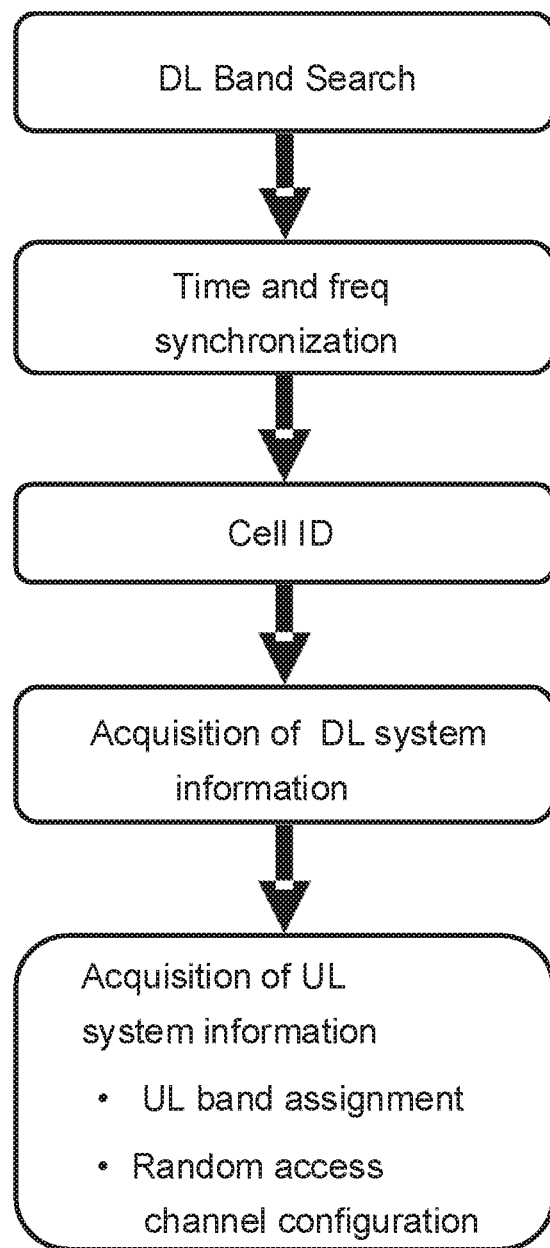
FIG. 18 is a block diagram of an example cell search procedure.

In some embodiments, a cell search procedure may comprise a DL band search and acquisition of UL system information as depicted in FIG. 18. In the DL band search, a mobile station may scan for the signature of a synchronization signal over potential DL bands and lock onto the DL band according to design criteria such as high signal power level, high signal to interference/noise ratio (SINR), low traffic load or large available capacity, or a combination thereof. In acquisition of UL system information, a mobile station may process the DL preambles or messages to extract the UL system information such as the corresponding UL band assignment and random access channel configuration.

Referring to FIG. 18, in the cell search operation for network entry, a mobile station may be configured to search a DL frequency band by scanning for the signature of a DL synchronization signal over potential DL bands. Once the mobile station finds the DL synchronization signal, the mobile station may be configured to carry out time and frequency synchronization based on the DL signal. The mobile station may further be configured to determine the cell identity and acquire DL system information by processing the DL preambles or messages. The mobile station may also be configured to process the DL preambles or messages to extract the UL system information including the DL-UL association information.

In a cellular wireless communication system, a handoff procedure may be used by a mobile station to transfer an ongoing connection session from a (serving) cell to a (target) cell. In an FFDD system, the handoff procedure may further involve obtaining DL band and corresponding UL band assignment for the neighboring cells. A mobile station may obtain the band assignment/pairing information by receiving the advertisement message broadcast in the serving cell, or by directly scanning the DL bands used by neighboring cells and obtaining the information on the DL and corresponding UL band assignment of the target cell.

Figure 19:
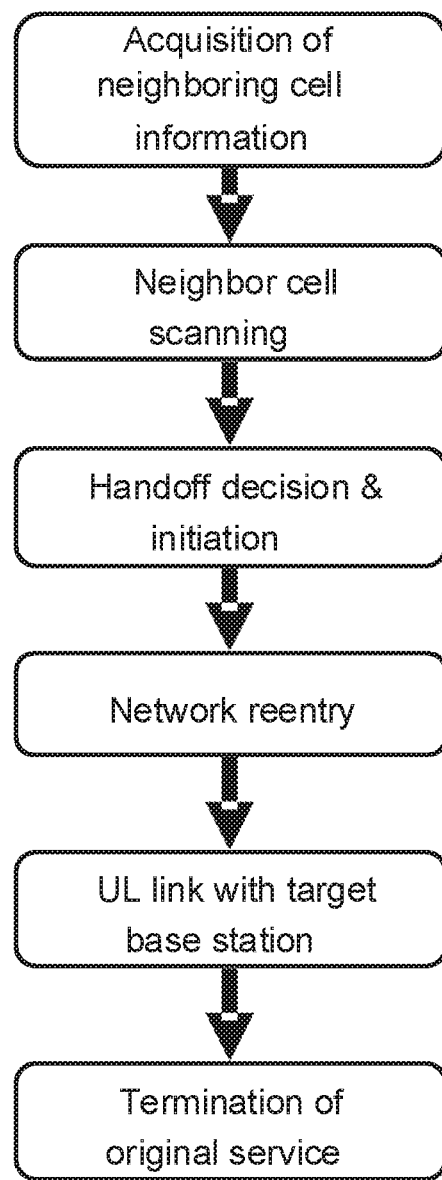
FIG. 19 is a block diagram of an example handoff procedure.

In some embodiments, a handoff procedure may comprise steps as shown in FIG. 19. To prepare for handoff, a mobile station may periodically scan neighboring cells. During the course of acquisition of neighboring cell information, a mobile station may receive neighbor advertisement messages providing proper handoff information. This information may reduce unnecessary overhead for scanning. Subsequently, the mobile station may scan neighboring cells and measure signal qualities, which can be used for determining whether to proceed with handoff. If a handoff decision is made, the mobile station may perform functions such as time and frequency synchronization, cell identity detection, and UL band information acquisition with respect to the target base station. Subsequently, the mobile station may establish a link with the target base station and then terminate service with the original base station.

Referring to FIG. 19, in the handoff operation a mobile station may be configured to acquire system information about its neighboring cells by periodically scanning signals from neighboring cells or by receiving neighbor advertisement messages about the neighboring cells from its serving cell. Subsequently, the mobile station may be configured to scan neighboring cells and measure the corresponding signal qualities for the handoff decision making. When a handoff decision is made, the mobile station may be configured to perform the network entry operation with respect to the target cell by carrying out time and frequency synchronization, determining the target cell identity, acquiring DL system information of the target cell by processing the DL preambles or messages, and acquiring UL system information of the target cell by processing the DL preambles or messages. The mobile station may be configured to establish a link with the target base station and terminate service with the original base station.

In some embodiments, spatial processing methods may be used to facilitate or enhance radio link performance. Spatial processing methods may include spatial multiplexing, spatial diversity, space-time (or -frequency) coding, beamforming, and techniques that exploit the characteristics of multiple antennas with different space displacements or polarizations. For example, spatial processing techniques can be used to balance the so-called link budget for DL and UL due to different transmission characteristics at two different frequencies (e.g., DL at UHF and UL at MMDS). As another example, an appropriate spatial processing technique (e.g., space multiplexing combined with space-time coding) may be implemented on the DL in a UHF band to increase data rates and link robustness, while in the UL on a MMDS band a base station may use beamforming to improve signal reception.

Figure 20:
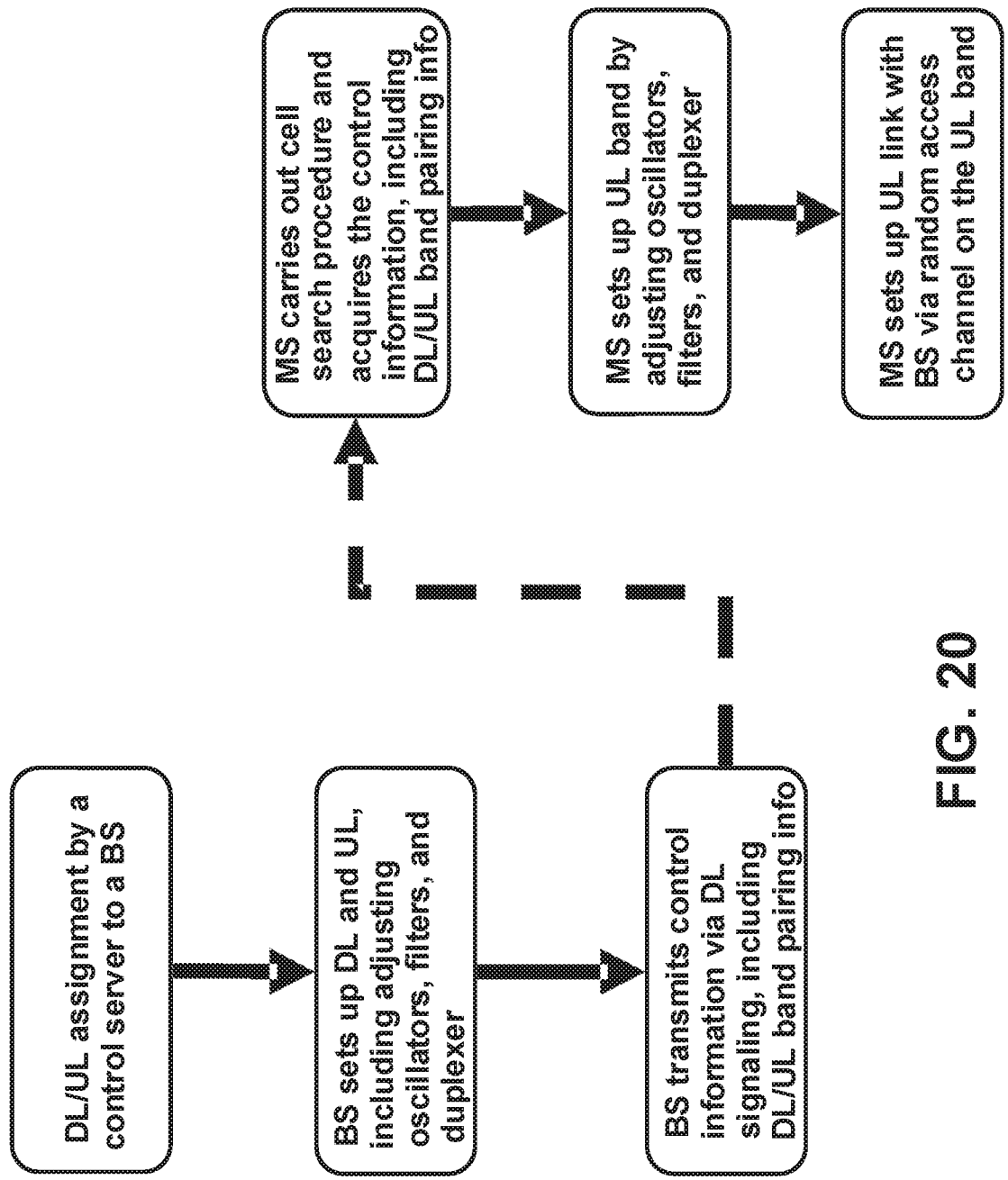
FIG. 20 is a block diagram of an example FFDD operation procedure.

Without loss of generality, an example is provided herein to illustrate an FFDD operation. FIG. 20 depicts an example procedure that can be used for an FFDD operation:

1. The DL/UL band pairing may be assigned by a control server to a base station. The assignment may be based on a methodology in accordance with embodiments described herein.
2. The base station may prepare the transmitter and receiver for DL and UL operations. In particular, the base station may adjust the oscillators (or frequency synthesizers) to generate center frequencies, filters to construct the appropriate bandwidths, and configured the duplexer to function at the appropriate frequencies.
3. The base station may broadcast information regarding D L/UL band association along with other control information through DL signaling on the DL band to its associated mobile stations.
4. A mobile station may carry out a cell search procedure and acquires the DL/UL band assignment and pairing information as well as other control information.
5. The mobile station may prepare the transmitter for UL transmission. According to the UL band information received from a DL signal, the mobile station may adjust the oscillators (or frequency synthesizers) to generate the center frequency, filters to construct the appropriate bandwidth, and configure the duplexer to function at the appropriate frequencies of the corresponding UL band.
6. The mobile station may send an access request to the base station via the random access channel within the UL band to complete the link with the base station.

There are, of course, other steps that may be executed in a communication system, but they are not included in the figure for clarity.

Figure 21:
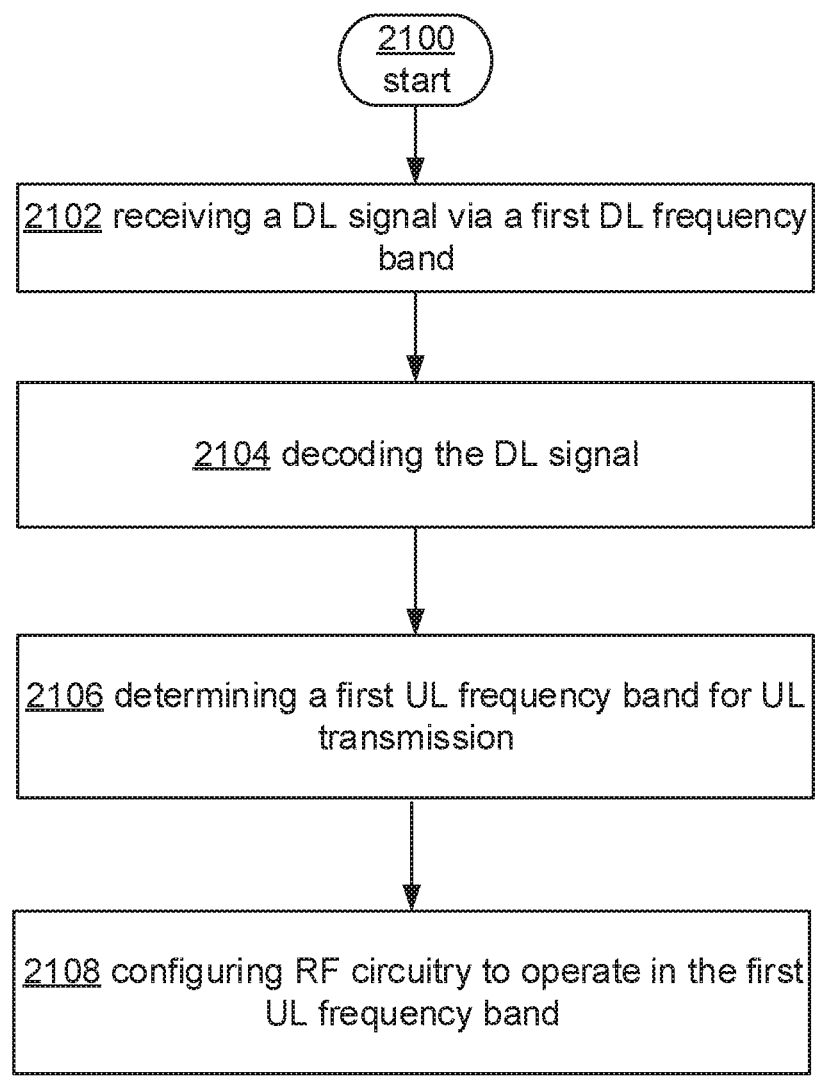
FIG. 21 illustrates an example of an operational procedure for practicing aspects of the present disclosure.

FIG. 21 depicts an exemplary operational procedure for communicating by a mobile device in a wireless communications system including operations 2100, 2102, 2104, 2106, and 2108. In one embodiment, the wireless communications system utilizes a plurality of frequency bands for downlink (DL) transmission and a plurality of frequency bands for uplink (UL) transmission, each frequency band having a center carrier frequency and an operation bandwidth. In some embodiments, the wireless communication system is configured for Orthogonal Frequency Division Multiple Access (OFDMA) or Code Division Multiple Access (CDMA).

Referring to FIG. 21, operation 2100 begins the operational procedure and in operation 2102 a DL signal is received via a first DL frequency band of the plurality of DL frequency bands for DL transmission, the DL signal including DL-UL frequency-band association information. In one embodiment, the DL signal is received from a base station covering a cell or from a super base station covering multiple cells.

In operation 2104, the DL signal is decoded to obtain the DL-UL frequency-band association information. In operation 2106, based on the decoded DL-UL frequency-band association information, a first UL frequency band of the plurality of UL frequency bands is determined for UL transmission. In operation 2108, the radio-frequency (RF) circuitry of the mobile device is configured to operate in the first UL frequency band for UL transmission.

In some embodiments, based on the decoded DL-UL frequency-band association information, the first UL frequency band is associated with the first DL frequency band to effectuate bidirectional communication with a base station.

In one embodiment, based on the decoded DL-UL frequency-band association information, the first UL frequency band is associated with a second DL frequency band of the plurality of DL frequency bands. The RF circuitry of the mobile device may then be configured to operate in the second DL frequency band for DL data reception.

In another embodiment, based on the decoded DL-UL frequency-band association information, a second UL frequency band of the plurality of UL frequency bands may be associated with a second DL frequency band of the plurality of DL frequency bands. The RF circuitry of the mobile device may then be configured to operate in the second DL frequency band for DL data reception and in the second UL frequency band for UL data transmission.

In one embodiment, the DL signal may be embedded in a DL preamble, mid-amble, or post-amble in a frame or super frame. Additionally and optionally, the DL signal may include a message indicating a cell identity of a serving cell. In some embodiments, the DL signal may include a message indicating a cell identity of a neighboring cell and an association of a DL frequency band of the plurality of DL frequency bands and a UL frequency band of the plurality of UL frequency bands for the neighboring cell.

Figure 22:
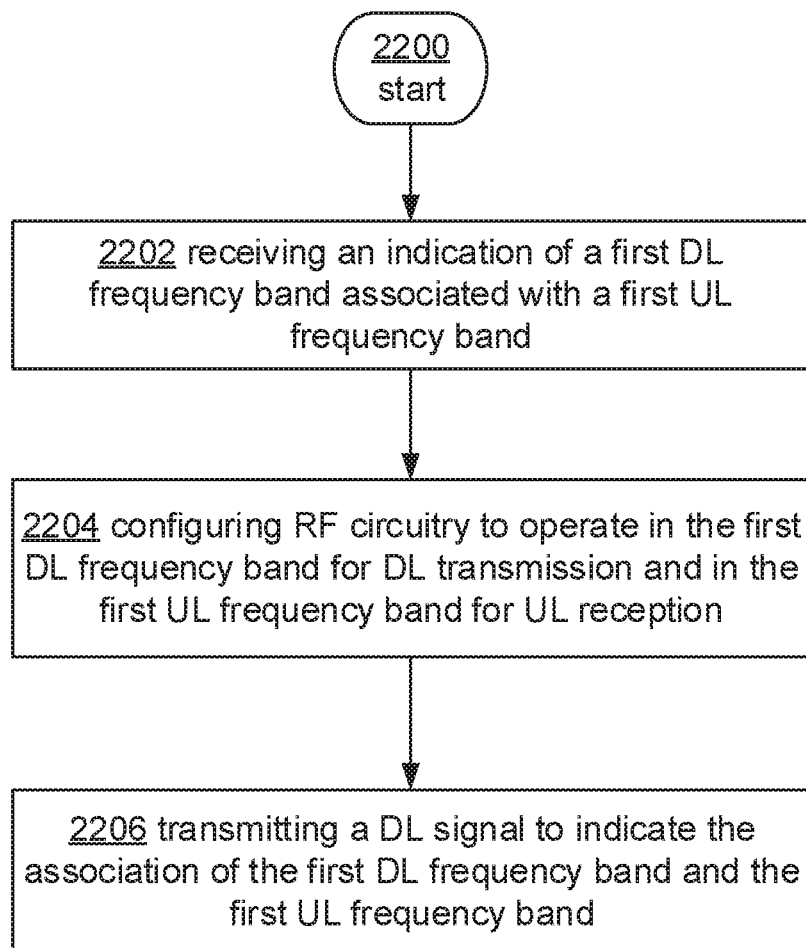
FIG. 22 illustrates an example of an operational procedure for practicing aspects of the present disclosure.

FIG. 22 depicts an exemplary operational procedure for communicating by a base station in a serving cell in a wireless communications system including operations 2200, 2202, 2204, and 2206. In one embodiment, the wireless communications system utilizes a plurality of frequency bands for downlink (DL) transmission and a plurality of frequency bands for uplink (UL) transmission, each frequency band having a center carrier frequency and an operation bandwidth. In some embodiments, the wireless communication system is configured for Orthogonal Frequency Division Multiple Access (OFDMA) or Code Division Multiple Access (CDMA).

Referring to FIG. 22, operation 2200 begins the operational procedure and in operation 2202 an indication of a first DL frequency band of the plurality of DL frequency bands associated with a first UL frequency band of the plurality of UL frequency bands is received. In one embodiment, the indication is received from a network or from a control facility within the base station.

In operation 2204, radio frequency (RF) circuitry of the base station is configured to operate in the first DL frequency band for DL transmission and in the first UL frequency band for UL reception.

In operation 2206, a DL signal is transmitted to a mobile device in the wireless communication system to indicate the association of the first DL frequency band and the first UL frequency band for establishing a bidirectional communication channel with a DL link and a UL link. In one embodiment, the DL signal enables the mobile device to configure RF circuitry of the mobile device to operate in the first UL frequency band for UL transmission. Furthermore, the DL signal may enable the mobile device to configure RF circuitry of the mobile device to operate in the first DL frequency band for DL reception.

In one embodiment, the DL signal is transmitted via the first DL frequency band. In another embodiment, the DL signal is transmitted via a second DL frequency band of the plurality of DL frequency bands. In some embodiments, the DL signal is embedded in a DL preamble, mid-amble, or post-amble in a frame or super frame.

In one embodiment, the DL signal includes a message indicating a cell identity of a serving cell. Furthermore, the DL signal may include a message indicating a cell identity of a neighboring cell and an association of a DL frequency band of the plurality of DL frequency bands and a UL frequency band of the plurality of UL frequency bands for the neighboring cell. In some embodiments, the DL signal may indicate an association of a second DL frequency band of the plurality of DL frequency bands and the first UL frequency band.

In some embodiments, the DL signal may indicate an association of a DL frequency band from a group of DL primary frequency bands and a group of DL auxiliary frequency bands, and a UL frequency band from a group of UL primary frequency bands and a group of UL auxiliary frequency bands. Furthermore, the association of the DL primary frequency bands and UL primary frequency band may be fixed and the association of the DL auxiliary frequency bands and UL auxiliary frequency bands may be flexible.

In one embodiment, the first DL frequency band is used for data unicasting and the second DL frequency band is used for data broadcasting or multicasting. In some embodiments, the first DL frequency band may be associated with a group of UL frequency bands of the plurality of UL frequency bands.

Figure 23:
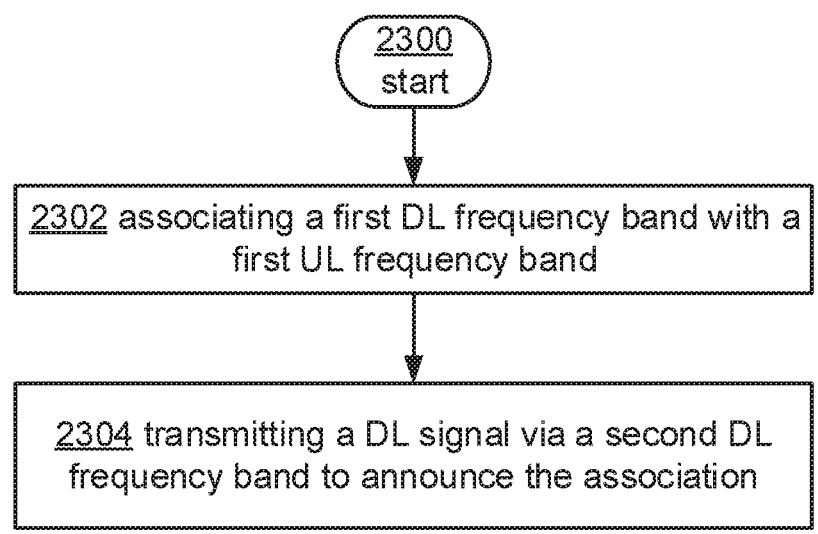
FIG. 23 illustrates an example of an operational procedure for practicing aspects of the present disclosure.

FIG. 23 depicts an exemplary operational procedure for operating a wireless communications system including operations 2300, 2302, and 2304. In one embodiment, the wireless communications system utilizes a plurality of frequency bands for downlink (DL) transmission and a plurality of frequency bands for uplink (UL) transmission, each frequency band having a center carrier frequency and an operation bandwidth.

Referring to FIG. 23, operation 2300 begins the operational procedure and in operation 2302 a first DL frequency band is associated with a first UL frequency band for establishing a communication channel with a DL link and a UL link. In one embodiment, the first DL frequency band is selected from the plurality of DL frequency bands for DL transmission and the first UL frequency band is selected from the plurality of UL frequency bands for UL transmission. In some embodiments, the second DL frequency band is the same as the first DL frequency band.

In operation 2304, a DL signal is transmitted via a second DL frequency band of the plurality of DL frequency bands to announce the association.

In one embodiment, the first DL frequency band or the first UL frequency band is selected based on:
- an interference level in the first DL frequency band;
- an interference level in the first UL frequency band;
- application type;
- quality of service requirements for DL transmission;
- quality of service requirements for UL transmission;
- DL modulation and coding schemes;
- UL modulation and coding schemes;
- spatial processing methods for DL;
- spatial processing methods for UL;
- transmit power levels; or
- a combination thereof.

Any of the above mentioned aspects can be implemented in methods, systems, computer readable media, or any type of manufacture. For example, a computer readable medium can store thereon computer executable instructions for communicating in a wireless communications system.

Lastly, while the present disclosure has been described in connection with the preferred aspects, as illustrated in the various figures, it is understood that other similar aspects may be used or modifications and additions may be made to the described aspects for performing the same function of the present disclosure without deviating there from For example, in various aspects of the disclosure, methods and systems for communicating in a wireless communications system were disclosed. However, other equivalent mechanisms to these described aspects are also contemplated by the teachings herein. Therefore, the present disclosure should not be limited to any single aspect, but rather construed in breadth and scope in accordance with the appended claims.

What is claimed is:

1. A method for a mobile device in an orthogonal frequency division multiplex (OFDM) communication system that utilizes two or more carriers for communication with a plurality of mobile devices, the method comprising:
receiving broadcast information indicating a plurality of carriers for communication;
receiving a first signal via a first downlink (DL) carrier of the plurality of carriers and a second signal simultaneously via a second DL carrier of the plurality of carriers, wherein the first DL carrier has a wider bandwidth than the second DL carrier and the first signal received via the first DL carrier has an increased subcarrier spacing in frequency and shorter OFDM symbols in time than the second signal received via the second DL carrier, wherein the first DL carrier is a different carrier than the second DL carrier; and
transmitting a signal via a third uplink (UL) carrier of the plurality of carriers.

2. The method of claim 1, further comprising receiving a message including system information via the second DL carrier, the message indicating that the third UL carrier is paired to the second DL carrier.

3. The method of claim 1, wherein the first DL carrier is a time division duplex (TDD) carrier and the third UL carrier is a same frequency carrier as the first DL carrier.

4. The method of claim 1, further comprising performing cell search by scanning frequency bands to periodically receive synchronization signals to acquire time and frequency synchronization for the second DL carrier and to detect a cell identity associated with the second DL carrier.

5. The method of claim 1, wherein the second DL carrier is a primary DL carrier and the first DL carrier is an auxiliary DL carrier.

6. The method of claim 1, wherein the UL carrier is at a higher frequency than the second DL carrier, wherein the second signal is spatial multiplexed, and wherein the signal transmitted via the third UL carrier is beamformed.

7. The method of claim 1, wherein the first DL carrier is in an unlicensed band and the third UL carrier is in a licensed band, and wherein the unlicensed band is only used by the OFDM communication system for downlink communication.

8. A mobile device in an orthogonal frequency division multiplex (OFDM) communication system that utilizes two or more carriers for communication with a plurality of mobile devices, the mobile device comprising:
a receiver configured to:
receive broadcast information indicating a plurality of carriers for communication; and
receive a first signal via a first downlink (DL) carrier of the plurality of carriers and a second signal simultaneously via a second DL carrier of the plurality of carriers, wherein the first DL carrier has a wider bandwidth than the second DL carrier and the first signal received via the first DL carrier has an increased subcarrier spacing in frequency and shorter OFDM symbols in time than the second signal received via the second DL carrier, wherein the first DL carrier is a different carrier than the second DL carrier; and
a transmitter configured to transmit a signal via a third uplink (UL) carrier of the plurality of carriers.

9. The mobile device of claim 8, wherein the receiver is further configured to receive a message including system information via the second DL carrier, the message indicating that the third UL carrier is paired to the second DL carrier.

10. The mobile device of claim 8, wherein the first DL carrier is a time division duplex (TDD) carrier and the third UL carrier is a same frequency carrier as the first DL carrier.

11. The mobile device of claim 8, wherein the receiver is further configured to perform cell search by scanning frequency bands to periodically receive synchronization signals to acquire time and frequency synchronization for the second DL carrier and to detect a cell identity associated with the second DL carrier.

12. The mobile device of claim 8, wherein the second DL carrier is a primary DL carrier and the first DL carrier is an auxiliary DL carrier.

13. The mobile device of claim 8, wherein the UL carrier is at a higher frequency than the second DL carrier, wherein the second signal is spatial multiplexed, and wherein the signal transmitted via the third UL carrier is beamformed.

14. The mobile device of claim 8, wherein the first DL carrier is in an unlicensed band and the third UL carrier is in a licensed band, and wherein the unlicensed band is only used by the OFDM communication system for downlink communication.

15. A method for a base station in an orthogonal frequency division multiplex (OFDM) communication system that utilizes two or more carriers for communication with a plurality of mobile devices, the method comprising:

transmitting broadcast information indicating a plurality of carriers for communication;

transmitting, to a mobile device, a first signal via a first downlink (DL) carrier of the plurality of carriers and a second signal simultaneously via a second DL carrier of the plurality of carriers, wherein the first DL carrier has a wider bandwidth than the second DL carrier and the first signal received via the first DL carrier has an increased subcarrier spacing in frequency and shorter OFDM symbols in time than the second signal received via the second DL carrier, wherein the first DL carrier is a different carrier than the second DL carrier; and receiving, from the mobile device, a signal via a third uplink (UL) carrier of the plurality of carriers.

16. The method of claim 15, further comprising transmitting a message including system information via the second DL carrier, the message indicating that the third UL carrier is paired to the second DL carrier.

17. The method of claim 15, wherein the first DL carrier is a time division duplex (TDD) carrier and the third UL carrier is a same frequency carrier as the first DL carrier.

18. The method of claim 15, further comprising:
periodically transmitting synchronization signals used for time and frequency synchronization for the second DL carrier; and transmitting an indication of a cell identity associated with the second DL carrier.

19. The method of claim 15, wherein the second DL carrier is a primary DL carrier and the first DL carrier is an auxiliary DL carrier.

20. The method of claim 15, wherein the UL carrier is at a higher frequency than the second DL carrier, wherein the second signal is spatial multiplexed, and wherein the signal received via the third UL carrier is beamformed.

21. The method of claim 15, wherein the first DL carrier is in an unlicensed band and the third UL carrier is in a licensed band, and wherein the unlicensed band is only used by the OFDM communication system for downlink communication.

22. The method of claim 15, further comprising exchanging with a second base station via a wired backbone link, radio resource allocation information for the mobile device, and internet data or multimedia data for the mobile device.

23. A base station in an orthogonal frequency division multiplex (OFDM) communication system that utilizes two or more carriers for communication with a plurality of mobile devices, the base station comprising:

a transmitter configured to:
transmit broadcast information indicating a plurality of carriers for communication; and transmit, to a mobile device, a first signal via a first downlink (DL) carrier of the plurality of carriers and a second signal simultaneously via a second DL carrier of the plurality of carriers, wherein the first DL carrier has a wider bandwidth than the second DL carrier and the first signal received via the first DL carrier has an increased subcarrier spacing in frequency and shorter OFDM symbols in time than the second signal received via the second DL carrier, wherein the first DL carrier is a different carrier than the second DL carrier; and receiving, from the mobile device, a signal via a third uplink (UL) carrier of the plurality of carriers.

24. The base station of claim 23, wherein the transmitter is further configured to transmit a message including system information via the second DL carrier, the message indicating that the third UL carrier is paired to the second DL carrier.

25. The base station of claim 23, wherein the first DL carrier is a time division duplex (TDD) carrier and the third UL carrier is a same frequency carrier as the first DL carrier.

26. The base station of claim 23, wherein the transmitter is further configured to:

periodically transmit synchronization signals used for time and frequency synchronization for the second DL carrier; and transmit an indication of a cell identity associated with the second DL carrier.

27. The base station of claim 23, wherein the second DL carrier is a primary DL carrier and the first DL carrier is an auxiliary DL carrier.

28. The base station of claim 23, wherein the UL carrier is at a higher frequency than the second DL carrier, wherein the second signal is spatial multiplexed, and wherein the signal received via the third UL carrier is beamformed.

29. The base station of claim 23, wherein the first DL carrier is in an unlicensed band and the third UL carrier is in a licensed band, and wherein the unlicensed band is only used by the OFDM communication system for downlink communication.

30. The base station of claim 23, wherein the base station further comprises a transceiver configured to exchange, with a second base station via a wired backbone link, radio resource allocation information for the mobile device, and internet data or multimedia data for the mobile device.

* * * * *

UNITED STATES PATENT AND TRADEMARK OFFICE
CERTIFICATE OF CORRECTION

| | |
|---|---|
| PATENT NO. | : 11,483,832 B1 |
| APPLICATION NO. | : 17/726846 |
| DATED | : October 25, 2022 |
| INVENTOR(S) | : Titus Lo and Xiaodong Li |

It is certified that error appears in the above-identified patent and that said Letters Patent is hereby corrected as shown below:

In the Claims

In Column 20, Line 15, in Claim 23, delete "receiving" and insert --a receiver configured to receive--, therefor.

Signed and Sealed this
Tenth Day of October, 2023

Katherine Kelly Vidal
*Director of the United States Patent and Trademark Office*